United States Patent
Gupta et al.

(10) Patent No.: US 9,976,070 B2
(45) Date of Patent: *May 22, 2018

(54) METHOD OF USING SHAPED COMPRESSED PELLETS IN WELL TREATMENT OPERATIONS

(71) Applicant: Baker Hughes, a GE company, LLC, Houston, TX (US)

(72) Inventors: D. V. Satyanarayana Gupta, The Woodlands, TX (US); Dong Shen, Houston, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/690,809

(22) Filed: Apr. 20, 2015

(65) Prior Publication Data

US 2016/0009980 A1 Jan. 14, 2016
US 2018/0072939 A9 Mar. 15, 2018

Related U.S. Application Data

(63) Continuation-in-part of application No. 13/678,431, filed on Nov. 15, 2012, and a continuation-in-part of
(Continued)

(51) Int. Cl.
*E21B 37/06* (2006.01)
*C09K 8/528* (2006.01)
(Continued)

(52) U.S. Cl.
CPC ............ *C09K 8/528* (2013.01); *C09K 8/03* (2013.01); *C09K 8/524* (2013.01); *C09K 8/536* (2013.01);
(Continued)

(58) Field of Classification Search
None
See application file for complete search history.

(56) References Cited

U.S. PATENT DOCUMENTS 1,570,537 A 1/1926 Teitsworth
2,378,155 A * 6/1945 Newsome ............... B01J 20/08
34/517
(Continued)

FOREIGN PATENT DOCUMENTS

CA 1262507 10/1989
EP 0540204 A2 5/1993
(Continued)

OTHER PUBLICATIONS

John B. Weirich, Terry D. Monroe, Brian B. Beall, Amit Kumar Singh, D.V. Staya Gupta, Jim McBee; Field Application of Chemically Treated Substrate in Pre-Packed Well Screen:; SPE 141054; Mar. 2011; 7 pgs; Society of Petroleum Engineers; Manama Bahrain.

(Continued)

*Primary Examiner* — Angela M DiTrani
(74) *Attorney, Agent, or Firm* — John Wilson Jones; Jones Delflache LLP

(57) ABSTRACT

A shaped compressed pellet formed from a composite of a well treatment agent adsorbed onto a calcined porous metal oxide or into the interstitial spaces of the calcined porous metal oxide may be introduced into an oil or gas producing well. The well treatment agent of the shaped compressed pellet may be used to prevent and/or control the formation of deposits in the well.

23 Claims, 9 Drawing Sheets

Related U.S. Application Data application No. 12/839,047, filed on Jul. 19, 2010, now Pat. No. 9,010,430, and a continuation-in-part of application No. 13/094,186, filed on Apr. 26, 2011, now Pat. No. 9,029,300.

(60) Provisional application No. 61/562,887, filed on Nov. 22, 2011, provisional application No. 62/028,151, filed on Jul. 23, 2014.

(51) Int. Cl.
    C09K 8/524 (2006.01)
    C09K 8/536 (2006.01)
    C09K 8/03 (2006.01)

(52) U.S. Cl.
    CPC .......... E21B 37/06 (2013.01); C09K 2208/20 (2013.01); C09K 2208/22 (2013.01); C09K 2208/32 (2013.01)

(56) References Cited

U.S. PATENT DOCUMENTS

| | | | |
|---|---|---|---|
| 3,179,170 A * | 4/1965 | Burtch | C09K 8/60 507/242 |
| 3,283,817 A | 11/1966 | Roberts | |
| 3,782,469 A * | 1/1974 | Fulford | E21B 43/267 166/279 |
| 3,850,248 A | 11/1974 | Carney | |
| 4,013,587 A | 3/1977 | Fischer et al. | |
| 4,108,779 A | 8/1978 | Carney | |
| 4,109,721 A | 8/1978 | Slusser | |
| 4,352,741 A | 10/1982 | Wernau | |
| 4,390,456 A | 6/1983 | Sanchez et al. | |
| 4,552,591 A | 11/1985 | Millar | |
| 4,582,131 A * | 4/1986 | Plummer | E21B 37/06 166/310 |
| 4,660,645 A | 4/1987 | Newlove et al. | |
| 4,738,897 A | 4/1988 | McDougall et al. | |
| 4,905,762 A | 3/1990 | Zilch | |
| 4,986,353 A | 1/1991 | Clark et al. | |
| 5,073,276 A | 12/1991 | Newlove et al. | |
| 5,102,558 A | 4/1992 | McDougall et al. | |
| 5,187,011 A | 2/1993 | Manalastas et al. | |
| 5,224,543 A | 7/1993 | Watkins et al. | |
| 5,225,123 A | 7/1993 | Torobin | |
| 5,741,758 A | 4/1998 | Pakulski | |
| 5,758,725 A | 6/1998 | Streetman | |
| 5,893,416 A | 4/1999 | Read | |
| 5,922,652 A | 7/1999 | Kowalski et al. | |
| 5,964,291 A * | 10/1999 | Bourne | C09K 8/80 166/279 |
| 6,025,302 A | 2/2000 | Pakulski | |
| 6,209,643 B1 | 4/2001 | Nguyen et al. | |
| 6,209,646 B1 | 4/2001 | Reddy et al. | |
| 6,279,656 B1 | 8/2001 | Sinclair et al. | |
| 6,326,335 B1 | 12/2001 | Kowalski et al. | |
| 6,331,508 B1 | 12/2001 | Pakulski | |
| 6,380,136 B1 | 4/2002 | Bates et al. | |
| 6,406,789 B1 * | 6/2002 | McDaniel | C08K 7/04 166/295 |
| 6,439,310 B1 | 8/2002 | Scott, III et al. | |
| 6,527,051 B1 | 3/2003 | Reddy et al. | |
| 6,613,899 B1 | 9/2003 | Kuzzee et al. | |
| 6,723,683 B2 | 4/2004 | Crossman et al. | |
| 6,866,797 B1 | 3/2005 | Martin et al. | |
| 7,028,776 B2 | 4/2006 | Kirk | |
| 7,270,184 B2 | 9/2007 | Kolter et al. | |
| 7,419,937 B2 * | 9/2008 | Rimmer | E21B 37/06 166/117 |
| 7,426,961 B2 | 9/2008 | Stephenson et al. | |
| 7,459,209 B2 | 12/2008 | Smith et al. | |
| 7,491,682 B2 | 2/2009 | Gupta et al. | |
| 7,493,955 B2 | 2/2009 | Gupta et al. | |
| 7,494,711 B2 | 2/2009 | Kaufman et al. | |
| 7,598,209 B2 | 10/2009 | Kaufman et al. | |
| 7,686,081 B1 * | 3/2010 | Becker | C09K 8/665 166/279 |
| 9,010,430 B2 * | 4/2015 | Darby | C09K 8/524 166/310 |
| 9,029,300 B2 * | 5/2015 | Gupta | C04B 38/009 507/269 |
| 9,102,860 B2 | 8/2015 | Cawiezel et al. | |
| 2002/0128157 A1 | 9/2002 | Bates et al. | |
| 2004/0043906 A1 | 3/2004 | Heath et al. | |
| 2004/0060702 A1 | 4/2004 | Kotlar et al. | |
| 2004/0074646 A1 | 4/2004 | Kotlar et al. | |
| 2004/0224155 A1 * | 11/2004 | Barron | B01D 67/0088 428/402 |
| 2004/0244969 A1 | 12/2004 | Koltar et al. | |
| 2005/0022991 A1 | 2/2005 | Rao | |
| 2005/0028976 A1 | 2/2005 | Nugyen et al. | |
| 2005/0034868 A1 | 2/2005 | Frost et al. | |
| 2005/0115710 A1 | 6/2005 | Koltar et al. | |
| 2006/0065396 A1 | 3/2006 | Dawson et al. | |
| 2006/0091572 A1 | 5/2006 | Santra et al. | |
| 2006/0124301 A1 | 6/2006 | Gupta et al. | |
| 2007/0036977 A1 | 2/2007 | Sinclair et al. | |
| 2007/0095528 A1 * | 5/2007 | Ziauddin | E21B 43/25 166/252.3 |
| 2007/0173417 A1 | 7/2007 | Kaufman et al. | |
| 2007/0202318 A1 | 8/2007 | Smith et al. | |
| 2008/0035339 A1 | 2/2008 | Welton et al. | |
| 2008/0035340 A1 | 2/2008 | Welton et al. | |
| 2008/0053657 A1 | 3/2008 | Alary et al. | |
| 2008/0058228 A1 | 3/2008 | Wilson | |
| 2008/0058229 A1 | 3/2008 | Berkland et al. | |
| 2008/0078547 A1 | 4/2008 | Sinclair et al. | |
| 2008/0182765 A1 | 7/2008 | Pershikova et al. | |
| 2008/0217012 A1 | 9/2008 | Delorey et al. | |
| 2008/0287324 A1 | 11/2008 | Pursley et al. | |
| 2009/0114247 A1 | 5/2009 | Brown et al. | |
| 2009/0131285 A1 | 5/2009 | Wang et al. | |
| 2009/0291861 A1 | 11/2009 | Sawdon | |
| 2009/0308610 A1 | 12/2009 | Windebank et al. | |
| 2009/0325825 A1 | 12/2009 | Gupta et al. | |
| 2010/0059224 A1 | 3/2010 | Palamara et al. | |
| 2010/0175875 A1 | 7/2010 | Becker et al. | |
| 2012/0012326 A1 | 1/2012 | Darby et al. | |
| 2012/0252706 A1 | 10/2012 | Steiner | |
| 2012/0318515 A1 | 12/2012 | Cawiezel et al. | |
| 2013/0029883 A1 | 1/2013 | Dismuke et al. | |
| 2013/0126158 A1 | 5/2013 | Gupta et al. | |
| 2015/0330197 A1 | 11/2015 | Brannon et al. | |
| 2016/0030916 A1 | 2/2016 | Shen et al. | |

FOREIGN PATENT DOCUMENTS

| | | | |
|---|---|---|---|
| GB | 2298440 | 9/1996 | |
| GB | 2520018 * | 5/2015 | C09K 8/80 |
| WO | 99/36668 A1 | 7/1999 | |
| WO | 99/54592 | 10/1999 | |
| WO | 200011949 A1 | 3/2000 | |
| WO | 2002040827 A1 | 5/2002 | |
| WO | 2005/017313 A1 | 2/2005 | |
| WO | WO2006129258 | 12/2006 | |
| WO | 2008032067 A1 | 3/2008 | |
| WO | 2016014310 A1 | 1/2016 | |

OTHER PUBLICATIONS

Sasol Germany GmBh; "Boehnnite, High Purity Alumina and Hydrotalcite"; 3 pgs; Sasol Germany GmbH; Hamburg Germany.
Sasol; "Aluminum Oxied, A1203"; Material Safety Data Sheet; Aug. 28, 2007; version 1.2; 7 pgs; SASOL; Germany Hamburg.
Carbo Ceramics "Carbo EconoProp"; 2010; 4 pgs; Carbo Ceramics; Houston, Texas.
P.J.C. Webb AEA Technology PLC, T.A., et al; Revolutionary New Chemical Delivery System for Fractured, Gravel Packed and Prepacked Screen Wells; SPE 38164; 1997.

(56) References Cited

OTHER PUBLICATIONS

P.J.C. Webb AEA Technology Plc, T.A_, et al; Economic and Technical Advantages of Revolutionary New Delivery System for Fractured and Gravel Packed Wells; SPE 38548; 1997.

P.J.C. Webb AEA Technology PLC, T.A., et al; Economic and Technical Features of a Revolutionary Chemical Scale Inhibitor Delivery Method for Fractured and Gravel Packed Wells: Comparative Analysis of Onshore and Offshore Subsea Applications; SPE 39451; 1998.

Norris, et al; Maintaining Fracture Performance Through Active Scale Control; SPE 68300; 2001.

Norris, et al; Hydraulic Fracturing for Reservoir Management Production Enhancement, Scale Control and Asphaltine Prevention; SPE 71655; 2001.

Mcinnich, et al; New Relationship Between Oil Company and Service Company Rejuvenates a Mature North Sea Gas Field; SPE 78327; 2002.

Szymczak, et al; Long-Term Scale Inhibition Using a Solid Scale Inhibitor in a Fracture Fluid; SPE 102720; 2006.

Gupta, et al; Solid Production Chemicals Added With the Frac for Scale, Paraffin and Asphaltene Inhibition; SPE 119393; 2009.

Gupta, et al; Multi-Year Scale Inhibition from a Solid Inhibitor Applied during Stimulation; SPE 115655; 2008.

Smith, et al; Solid Paraffin Inhibitor Pumped in a Hydraulic Fracture Provides Long-Term Paraffin Inhibition in Permian Basin Wells; SPE 124868; 2009.

Pallanich; Slow-release medication relieves deepwater headache; Offshore Engineer; Aug. 2007.

Szymczak et al; Treat production problems before they occur; E&P; Jul. 2008.

D.M. Frigo et al; Chemical Inhibition of Halite Scaling in Topsides Equipment; SPE 60191; 2000.

\* cited by examiner

METHOD OF USING SHAPED COMPRESSED PELLETS IN WELL TREATMENT OPERATIONS

This application is a continuation-in-part application of U.S. patent application Ser. No. 12/839,047, filed on Jul. 19, 2010 and U.S. patent application Ser. No. 13/094,186, filed on Apr. 26, 2011, both of which are herein incorporated by reference.

FIELD OF THE INVENTION

The invention relates to shaped compressed pellets and method of using the same in the slow release of well treatment agents into a well. The shaped compressed pellets are formed from a composite of a well treatment agent adsorbed onto a calcined porous metal oxide or into the interstitial spaces of the porous metal oxide.

BACKGROUND OF THE INVENTION

Fluids produced from wells typically contain a complex mixture of components including aliphatic hydrocarbons, aromatics, hetero-atomic molecules, anionic and cationic salts, acids, sands, silts and clays. The nature of these fluids, combined with the severe conditions of heat, pressure, and turbulence to which they are often subjected, are contributing factors to the formation and deposition of unwanted contaminants, such as scales, salts, paraffins, corrosion, bacteria and asphaltenes in oil and/or gas production wells.

Such unwanted contaminants typically restrict the movement of fluids in production piping and further potentially plug flow paths of fluids (including reservoir flow paths). For instance, common mineral scales such as calcium carbonate, calcium sulfate, or barium sulfate often precipitate from produced water and create blockages in flow paths in production tubulars. The formation and deposition of such unwanted contaminants reduce well productivity, and, in some cases, completely blocks the tubing.

Treatments to remove deposits and inhibit the formation of unwanted deposits include the use of various mechanical preventative techniques such as scrapers or reamers and chemical treatment agents such as inhibitors, acids and converters. While mechanical tools are effective when the tubular is at an approximate 180° to the point of entry (as gravity helps pull the treatment device into the well), they have limited effectiveness when the tubular being treated is deviated, as in a horizontal well or "S" shaped configuration. The flexibility of mechanical tools makes it difficult to push a long distance past a severe deviation or multiple deviations. Chemical prevention or remedial techniques can be effective if the treatment can be delivered reliably to the target location and in sufficient quantity to address the issues.

Chemical treatment agents may be delivered to unwanted deposits by the technique of "downhole squeezing" wherein a slug of a well treatment composition is injected into the annulus of the well, using a pre-flush, squeeze, and over flush treatment before the well can be returned to normal function. This technique requires large volumes of treatment and flush fluid in horizontal wells with a large area of perforated interval. Further treatments are typically required as the chemical residual is depleted, once again requiring large volumes of flush and treatment into the well. Such treatment methods are typically inefficient in horizontal wells because it is difficult to ensure the treatment is delivered to all the intended area. Further, the flush and chemical additives often require large pumps and holding tanks which can add significant costs to the application.

Solid chemical additives in the form of a slurry are further often used. This type of treatment is effective in vertical wells but requires a flush to aid in delivery of the treatment agent to the bottom of the well. In a deviated well such as a horizontal well or well with multiple deviations such as an "S" shaped completion, it is important that the slurry mass not be too heavy in order for the flush to be carried past the deviation. If the density of the slurry is too high, the slurry just settles beyond the deviation.

Capillary tubing lengths are frequently installed in wells to aid in delivery of a chemical treatment. This technique is effective in its intended function but is expensive and requires specialized equipment to install. Further, capillary tubing may not be able to extend to great depths if the deviation angle is severe or the piping extends far beyond the bend.

While solid additives have been added to the well during the completion stage, this technique has only been proven to be an effective delivery method in new wells when the opportunity to spot the chemical additive is available.

Alternative treatment methods have therefore been sought for introducing solid well treatment agents into producing oil and/or gas wells and especially in those where tubing is deviated or contains multiple deviations.

SUMMARY OF THE INVENTION

In an embodiment, a shaped compressed pellet is disclosed. The pellet comprises a binder and a well treatment composite. The well treatment composite contains a well treatment agent and a calcined porous metal oxide. The porosity and permeability of the calcined porous metal oxide is such that the well treatment agent is adsorbed onto the surface of the calcined porous metal oxide or into the interstitial spaces of the calcined porous metal oxide.

In another embodiment, a method of inhibiting or controlling the rate of release of a well treatment agent in a well is disclosed by introducing into the well a shaped compressed pellet. The pellet comprises a binder and a well treatment composite. The well treatment composite contains a well treatment agent and calcined porous metal oxide. The porosity and permeability of the calcined porous metal oxide is such that the well treatment agent is adsorbed onto the surface of the calcined porous metal oxide or into the interstitial spaces of the calcined porous metal oxide.

In another embodiment, a method of inhibiting or controlling the rate of release of a well treatment agent in a well is disclosed by introducing into the well a shaped compressed pellet of a composite comprising a well treatment agent and calcined porous metal oxide. The well treatment agent is adsorbed onto the surface of the calcined porous metal oxide or into the interstitial spaces of the calcined porous metal oxide.

The porosity and permeability of the calcined porous metal oxide is such that the well treatment agent is adsorbed onto its surface or into its interstitial spaces. The surface area of the calcined porous metal oxide may be between from about 1 $m^2/g$ to about 10 $m^2/g$. The diameter of the calcined porous metal oxide may be between from about 0.1 to 3 mm. The pore volume of the calcined porous metal oxide may be between from about 0.01 to about 0.10 cc/g. The bulk density of the composite may be between from about 75 to about 150 lb/$ft^3$. The specific gravity of the well treatment composite may be less than or equal to 3.75 g/cc.

In another embodiment of the disclosure, a method of inhibiting or controlling the rate of release of a well treatment agent in a well is provided. In this embodiment, a shaped compressed pellet is placed into a receptacle. The shaped compressed pellet comprises a binder and a composite of a well treatment agent adsorbed onto a water-insoluble adsorbent or into interstitial spaces of the adsorbent. The receptacle is affixed to the bottom of a bottom hole electric submersible pump by hanging the receptacle from the bottom of the bottom hole electric submersible pump. The bottom hole electric submersible pump with the affixed receptacle is then lowered into the well. The well treatment agent is continuously released from the water-insoluble adsorbent.

In another embodiment of the disclosure, a method of inhibiting or controlling the formation of unwanted deposits in a deviated well is provided. In this embodiment, a shaped compressed pellet is introduced into tubing within the well. The shaped compressed pellet comprises a well treatment composite. The well treatment composite comprises a well treatment agent and calcined porous metal oxide. The porosity and permeability of the calcined porous metal oxide is such that the well treatment agent is adsorbed onto the porous metal oxide or into the interstitial spaces of the porous metal oxide. The shaped compressed pellet is then flowed over obstructions within the tubing and deviations in the well into a targeted area in the well where unwanted deposits are undesired. The well treatment agent is then continuously released from the shaped compressed pellet into the targeted area.

A major advantage of the shaped compressed pellets described herein is that their introduction into the well does not typically require any specialized equipment. They are especially useful in the treatment of production wells where traditional mechanical means are unable to reach.

BRIEF DESCRIPTION OF THE DRAWINGS

In order to more fully understand the drawings referred to in the detailed description of the present invention, a brief description of each drawing is presented, in which.

DETAILED DESCRIPTION OF THE PREFERRED EMBODIMENTS

Figure 1A:
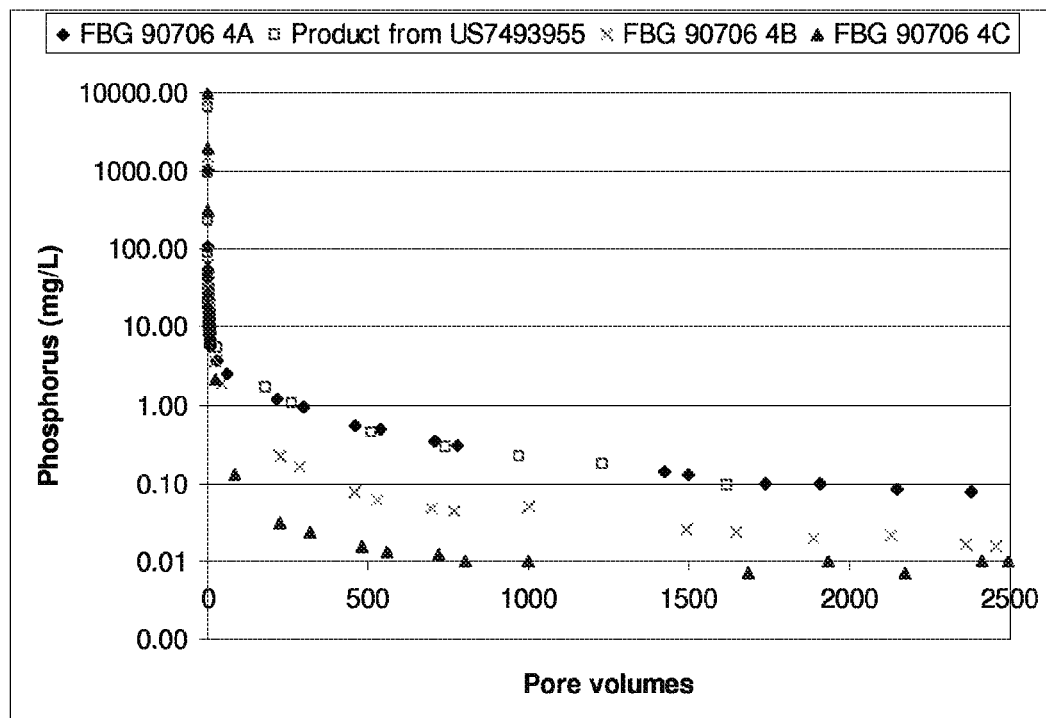
FIG. 1A and FIG. 1B are release profiles of a scale inhibitor in a high strength composites containing porous alumina adsorbents between 0 to 2,500 pore volumes and 0 to 10,000 pore volumes, respectively.

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

As used herein and throughout various portions (and headings) of this patent application, the terms "disclosure", "present disclosure" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

The composites defined herein are used in the treatment of gas or oil wells in order to inhibit the formation of undesired contaminants, control the formation of undesired contaminants or retard the release of undesired contaminants into the well. For instance, the composite may be used in completion or production services. The composites of the invention may be used in the well to remove undesired contaminants from or control the formation of undesired contaminates onto tubular surface equipment within the wellbore.

In a preferred embodiment, the well treatment composite of the invention effectively inhibits, controls, prevents or treats the formation of inorganic scale formations being deposited in subterranean formations, such as wellbores, oil wells, gas wells, water wells and geothermal wells. The composites of the invention are particularly efficacious in the treatment of scales of calcium, barium, magnesium salts and the like, including barium sulfate, calcium sulfate, and calcium carbonate scales. The composites may further have applicability in the treatment of other inorganic scales, such as zinc sulfide, iron sulfide, etc.

The well treatment composite may also be used to control and/or prevent the undesired formation of salts, paraffins, gas hydrates, asphaltenes as well as corrosion in formations or on surface equipment.

The shaped compressed pellets defined herein may be characterized by a calcined porous substrate prepared from nano-sized material onto which may be adsorbed at least one well treatment agent. The porosity and permeability of the calcined porous substrate may be such that the well treatment agent may be absorbed into the interstitial spaces of the porous substrate. The amount of well treatment agent in the composite is normally from about 1 to 50 weight percent, preferably from about 14 to about 40 weight percent.

The surface area of the calcined porous substrate is between from about 1 $m^2/g$ to about 10 $m^2/g$, preferably between from about 1.5 $m^2/g$ to about 4 $m^2/g$, the diameter of the calcined porous substrate is between from about 0.1 to about 3 mm, preferably between from about 150 to about 1780 micrometers, and the pore volume of the calcined porous substrate is between from about 0.01 to about 0.10 cc/g. Typically, the specific gravity of the well treatment composite is less than or equal to 3.75 g/cc.

The calcined porous substrate is typically spherical and insoluble in well fluids under subterranean conditions, such as at temperatures less than about 250° C. and pressures less than about 80 MPa.

The porous substrate may be a metal oxide, such as alumina, zirconium oxide and titanium oxide. Typically, the porous substrate is alumina.

The porous substrate may be prepared by first mixing a metal oxide hydrosol (such as aluminum oxide hydrosol) containing a hydrate of the metal oxide or activated metal (such as activated alumina) and an additive component selected from carbon (such as carbon black) or a high molecular weight natural organic material (such as wood flour and starch) which is insoluble in aqueous solution up to a temperature of 50° C. and carbon with a solution of hydrolyzable base to form a mixture. The mixture may then be introduced in dispersed form into a water-immiscible liquid having a temperature of from about 60° to 100° C., whereby gel particles are formed. The gel particles may then be aged in the liquid at the temperature and subsequently in an aqueous base, such as an aqueous ammonia solution. The aged particles may then be recovered. The recovered particles may then be calcined. During calcination, the additive component is removed.

The calcined particles have a lower bulk density when the additive component is present during calcinations than when the additive component is not present. Typically, the bulk density of the well treatment composite is between from about 75 to about 150 lb/ft³. In addition, combustion of the additive component during calcinations of the hydrosol results in formation of pores of the calcined metal oxide.

The metal oxide hydrosol may optionally contain a silica-containing substance which in their non-soluble form is coprecipitated with the metal oxide particles. The silica-containing substance is preferably a low density silica, such as that prepared by hydrolysis of silicon tetrachloride in an oxyhydrogen flame and known under the designation pyrogenic silica.

In an embodiment, the porous substrate may be prepared from a concentrated metal oxide hydrosol of a pH value in the range of about 3 to about 5 which, in turn, is prepared by dissolving metal in hydrochloric acid and/or metal chloride in aqueous solution or by dissolving metal hydroxychloride in water, the concentration of which is adjusted so that metal oxide derived from the sol amounts to 15 to 35% by weight, preferably to 20 to 30% by weight of the mass of the calcined particles. Metal oxide hydrate and/or activated metal, preferably of an average particle diameter of maximally 10μ, is then added to the hydrosol in an amount so that the metal oxide content amounts to 65 to 85% by weight, preferably 70 to 80% by weight of the calcined particles. Optionally, pyrogenic silica may be added to the hydrosol such that the SiO2 content of the calcined particles amounts to 10 to 40% by weight. A soft to medium-hard wood flour may then added to the mixture, the wood flour being ground to a finer particle size such that it is present in a quantity of 5 to 35% by weight, preferably 10 to 25% by weight relative to the mass of the calcined particles. The hydrosol containing the wood flour may then be mixed with a concentrated aqueous solution of hexamethylene tetramine and then sprayed or dropped into a column filled with the mineral oil of a temperature of 60° C. to 100° C. The gel particles are then allowed to remain at the temperature of precipitation for a period of time from 4 to 16 hours; thereafter the gel particles are aged for 2 to 8 hours in aqueous ammonia solution, washed with water, dried at 100° C. to 150° C., or preferably at from about 120° C. to about 200° C., preheated to 250° C. to 400° C. and calcined at a temperature of 600° C. to about 1000° C.

In a preferred embodiment, when the metal oxide adsorbent is alumina adsorbent, the adsorbent may be prepared by hydrolyzing aluminum alkoxides to render nano sized alumina, drying to remove water and then introducing the dried aluminum in a dispersed form into an oil at a temperature of from about 60° to 100° C., whereby gel particles are formed. The gel particles are then aged in the liquid and subsequently in an aqueous ammonia solution, recovered and then calcined. Nano sized alumina may be produced having an average diameter in the range from about 0.4 mm to about 1 mm.

Alternative methods for making porous substrates adsorbent are further disclosed in U.S. Pat. No. 4,013,587, herein incorporated by reference.

Adsorption of the well treatment agent onto the calcined porous substrate and into the interstitial spaces of the substrate reduces (or eliminates) the amount of well treatment agent required to be in solution. For instance, where the well treatment agent is a scale inhibitor, the amount of scale inhibitor released from the composite is that amount required to prevent, or to at least substantially reduce the degree of, scale formation. For most applications, the amount of well treatment agent released from the composite may be as low as 1 ppm. Costs of operation are therefore significantly lowered. In light of the physical interaction between the well treatment agent and the porous substrate, only a small amount of well treatment agent may be released into the aqueous or hydrocarbon medium.

Such shaped compressed pellets may further be used in stimulation of a well by being introduced into a subterranean formation or into the wellbore penetrating the subterranean formation. The pellets defined herein are sufficiently strong at high pressures to be used as a proppant in hydraulic fracturing operations including temperatures in excess of 250° C. and pressures in excess of 80 MPa. When used in hydraulic fracturing (and/or sand control treatments), the porous particulate may be selected so to exhibit crush resistance under conditions as high as 10,000 psi closure stress, API RP 56 or API RP 60, generally between from about 250 to about 8,000 psi closure stress.

When used in an oil, gas or geothermal well or a subterranean formation penetrated by such a well, the well treatment agent may be slowly released from the porous substrate and may be slowly released into a proppant pack. The composite thus exhibits the strength of a conventional proppant yet allows for the slow release of one or more well treatment agents into the formation and/or wellbore. In some instances, the well treatment composite may be used as the proppant per se.

In an embodiment, the shaped compressed pellets may be a component of a fracturing fluid or acidizing fluid, such as a matrix acidizing fluid. The pellets may have particular applicability in completion fluids containing zinc bromide, calcium bromide calcium chloride and sodium bromide brines. Such fluids may be introduced down the annulus of the well and, when desired, flushed with produced water.

The pellets may be used in combination with conventional proppants or sand control particulates. Such proppants or sand control particulates may be a conventional particulate material employed in hydraulic fracturing or sand control operations, e.g., sand ((having an apparent specific gravity (ASG), API RP 60, of 2.65)) or bauxite (having an ASG of 3.55). Alternatively, the proppant or sand control particulate may be "relatively lightweight", defined as a particulate that has an ASG (API RP 56) that is less than about 2.45, more preferably less than or equal to 2.0, even more preferably less than or equal to 1.75, most preferably less than or equal to 1.25. Such different types of particulates may be selected, for example, to achieve a blend of different specific gravities or densities relative to the selected carrier fluid. For example, a blend of three different particles may be selected for use in a water fracture treatment to form a blend of well treatment particulates having three different specific gravities, such as an ASG of the first type of particle from about 1 to less about 1.5; an ASG of the second type of particle from greater than about 1.5 to about 2.0; and ASG of the third type of particle from about greater than about 2.0 to about 3.0; or in one specific embodiment the three types of particles having respective specific gravities of about 2.65, about 1.7 and about 1.2. In one example, at least one of the types of selected well treatment particulates may be selected to be substantially neutrally buoyant in the selected carrier or treatment fluid. In some instances, the well treatment composition may contain between from about 1 to about 99% by weight of conventional proppant.

The pellets are particularly effective in hydraulic fracturing as well as sand control fluids such as water, salt brine, slickwater such as slick water fracture treatments at relatively low concentrations to achieve partial monolayer fractures, low concentration polymer gel fluids (linear or crosslinked), foams (with gas) fluid, liquid gas such as liquid carbon dioxide fracture treatments for deeper proppant penetration, treatments for water sensitive zones, and treatments for gas storage wells.

When used in hydraulic fracturing, the composite may be injected into a subterranean formation in conjunction with a hydraulic fracturing fluid at pressures sufficiently high enough to cause the formation or enlargement of fractures. Since the particulates may withstand temperatures greater than about 370° C. and closure stresses greater than about 8000 psi, they may be employed as the proppant particulate. Alternatively, the composite may be employed in conjunction with a conventional proppant. Since the porous particulate of the composite is insoluble, the composite may continue to function as a proppant even after the well treatment agent has been completely leached out of the composite.

Fluids containing the well treatment composites may be used to optimize hydraulic fracture geometries and enhance well productivity. As an example, the fluids may be used to achieve increased propped fracture length in relatively tight gas formations. Choice of different particulate materials and amounts thereof to employ in such blends may be made based on one or more well treatment considerations including, but not limited to, objective/s of well treatment, such as for sand control and/or for creation of propped fractures, well treatment fluid characteristics, such as apparent specific gravity and/or rheology of carrier fluid, well and formation conditions such as depth of formation, formation porosity/permeability, formation closure stress, type of optimization desired for geometry of downhole-placed particulates such as optimized fracture pack propped length, optimized sand control pack height, optimized fracture pack and/or sand control pack conductivity and combinations thereof. The fracturing fluid, to be used with the composite, exhibits high viscosity, so as to be capable of carrying effective volumes of one or more proppants. It may include aqueous gels and hydrocarbon gels.

In another embodiment, the well treatment composite may be used to pre-pack a screen for use in gravel packed wells. A screen assembly such as is known in the art may be placed or otherwise disposed within the wellbore so that at least a portion of the screen assembly is disposed adjacent the subterranean formation. In this embodiment, the composite is preferably placed as close to the point of equilibrium as possible in order to ensure the continuous release of the well treatment agent throughout the producing flow stream. A slurry including the composite and a carrier fluid may then be introduced into the wellbore and placed adjacent the subterranean formation by circulation or other suitable method so as to form a fluid-permeable pack in an annular area between the exterior of the screen and the interior of the wellbore that is capable of reducing or substantially preventing the passage of formation particles from the subterranean formation into the wellbore during production of fluids from the formation, while at the same time allowing passage of formation fluids from the subterranean formation through the screen into the wellbore. It is possible that the slurry may contain all or only a portion of the composite; the balance of the slurry may be another material, such as a conventional gravel pack particulate.

Thus, the shaped pellets may be used as a preventative measure by stopping precipitation and deposition of the well treatment agent before it starts. Such alternatives are desired, for instance, when there is a need to increase the amount of the solid well treatment agent that can be placed in gravel packed wells there the amount of proppant or gravel placed in the well is at a minimum. In addition, the well treatment composites in prepacked screens may be used to increase the amount of solid substrate exposed during sand control. When used in sand control, screens prepacked with the well treatment composite may reduce intervention costs for remediation and further increases the effectiveness of the operation. Preferably, however, the screen used is of a size to reduce plugging by formation fines migration.

As an alternative to use of a screen, the composite may be used in any method in which a pack of particulate material is formed within a wellbore that it is permeable to fluids produced from a wellbore, such as oil, gas, or water, but that substantially prevents or reduces production of formation materials, such as formation sand, from the formation into the wellbore. Such methods may or may not employ a gravel pack screen, may be introduced into a wellbore at pressures below, at or above the fracturing pressure of the formation, such as frac pack, and/or may be employed in conjunction with resins such as sand consolidation resins if so desired.

The shaped compressed pellets defined herein may further be formed from a composite having a well treatment agent adsorbed onto a water-insoluble adsorbent. The composite may be those disclosed in U.S. Pat. Nos. 7,491,682 and 7,493,955, herein incorporated by reference. In addition, the compressed pellet may contain a weighting agent in order to increase the specific gravity of the pellet.

The water insoluble adsorbent may be any of various kinds of commercially available high surface area materials having the affinity to adsorb the desired well treatment agent. Typically, the surface area of the adsorbent of the well treating composite is between from about 1 $m^2/g$ to about 100 $m^2/g$.

Suitable adsorbents include finely divided minerals, fibers, ground almond shells, ground walnut shells, and ground coconut shells. Further suitable water-insoluble adsorbents include activated carbon and/or coals, silica particulates, precipitated silicas, silica (quartz sand), alumina, silica-alumina such as silica gel, mica, silicate, e.g., orthosilicates or metasilicates, calcium silicate, sand (e.g., 20-40 mesh), bauxite, kaolin, talc, zirconia, boron and glass, including glass microspheres or beads, fly ash, zeolites, diatomaceous earth, ground walnut shells, fuller's earth and organic synthetic high molecular weight water-insoluble adsorbents. Particularly preferred are diatomaceous earth and ground walnut shells.

Further useful as adsorbents are clays such as natural clays, preferably those having a relatively large negatively charged surface and a much smaller surface that is positively charged. Other examples of such high surface area materials include such clays as bentonite, illite, montmorillonite and synthetic clays.

The weight ratio of well treatment agent to water-insoluble adsorbent in the composite is generally between from about 90:10 to about 10:90.

As the oilfield fluid passes through or circulates around the well treatment composites, the well treatment agent slowly desorbs. In so doing, the composites are characterized by time-release capabilities. Gradual desorption of the well treatment agents insures that they are available to produced fluids for extended periods of time, typically extending for periods of time greater than a year and even as long as five years. Thus, the lifetime of a single treatment using the composite may be between 12 months and in excess of 5 years.

The amount of well treatment agent in the composite is that amount sufficient to effectuate the desired release into the flowing produced fluid over a sustained period of time. Typically the resulting concentration of the well treatment agent in the wellbore is between from about 1 to about 50 ppm. In some instances, the amount of well treatment agent in the well produced fluid may be as low as 0.1 ppm. Such small amounts of well treatment agents in the produced fluid released from the composite forming the compressed pellet may be sufficient for up to 1,000 pore volumes.

When placed into a well, the well treatment agent slowly dissolves at a generally constant rate over an extended period of time in the water or hydrocarbons which are contained in the formation and/or well. The composite therefore permits a continuous supply of the well treatment agent into the targeted area.

The well treatment agent is slowly released from the compressed pellet after being introduced into a targeted area in the well. The targeted area may be a site in the well where deposits have already formed or a location in the well where it is desirable for deposits not to form. The compressed pellets provide a continuous supply of the well treatment agent into the targeted area.

The pellets have particular applicability in areas within the well where conventional systems have been unable to reach.

Use of the shaped pellets renders unnecessary the use of burdensome mechanical tools and procedures. While the shaped compressed pellets may be used to treat any type of well that requires chemical treatment, they have particular applicability in the treatment of production wells where traditional mechanical means such as wire lines or coil tubing have been unable to reach. For instance, the shaped pellets may be introduced directly into production tubing by being dropped directly into the well head or may be placed in a receptacle and lowered into the well.

When introduced into production tubing within the well, the shape and specific gravity of the pellets causes the particulates to flow past obstructions and through well deviations such that the pellets may be placed at or in close proximity to the targeted area where treatment is desired. Continuous release of the well treatment agent with the production fluid further protects the tubular and the surface equipment from unwanted deposits which may otherwise be formed. Production from the well is thereby improved.

Similar performance has been seen in producing wells where the shaped pellets are used simply to deploy production chemicals, particularly in horizontal wells where capillary deployment is not possible to the toe of the horizontal section of the well or where squeeze treatments are impractical; for example, in wells which have not been stimulated.

The shaped pellets may be dropped directly into the well from the well head. When introduced into production tubing within an oil or gas well, the shaped pellets easily flow past obstructions and through well deviations. Continuous release of the well treatment agent with the production fluid protects the tubular and the surface equipment from unwanted deposits which may be formed in the tubular or surface equipment. The high specific gravity of the shaped pellets allows them to pass by gravity into and through production tubing.

The shaped pellets are especially useful when introduced into horizontal or deviated wells since they easily pass through restrictions in the wellbore and flow into low points of the horizontal well or past obstruction in a deviated well.

When shaped as spheres, the pellets are able to readily roll over obstructions within the tubing and thru well deviations to effectively place the well treatment agent in close proximity to the targeted area. The spheres are especially useful in delivering well treatment agents in wells having deviations ranging from 45° to 89° or in wells with multiple deviations such as "S" shaped completions.

When formed to resemble hockey pucks, the shaped pellets may be placed into a receptacle and suspended at distant locations within the well. When the well treatment agent is depleted within the receptacle, the receptacle may then be pulled to the surface and reloaded with additional pellets.

The shaped pellets may be in the form of a sphere, cylinder, rod or any other shape which allows for the slow release of the well treatment agent into the targeted area. In some applications, the shaped pellets are cylindrically shaped having a length of about 0.5 inch to about 6 inches, preferably from about 1 inch to about 2 inches and a diameter of from about 0.25 inch to about 4 inches, preferably from about 0.5 inch to about 1 inch.

In those instances where the shaped pellet is to be directly dropped into the well from the well head, the pellet is preferably spherical and is formed into a ball-like sphere having a diameter between from about ½ inch to about 3 inches, more preferably from about ¾ inch to about 2½ inches, most preferably approximately 1¾ inch. Such spheres resemble spherical balls.

The specific gravity of the shaped pellets is generally between from about 1.1 to about 3. In a preferred embodiment, the specific gravity of the sphere is between from about 2 to about 2.5.

Such specific gravity is especially desirable when the shaped pellets are spherical and where it is desired to drop the pellet directly into the well head. When used as one or more spherical balls, the pellets may be introduced into the well above the master valve at the wellhead. The isolation valve above the spherical ball(s) may then be closed and the master valve then opened. Gravitational forces will pull the ball(s) into the production tubing. The low specific gravity allows the sphere(s) to fall by gravitational forces through the production tubing. The combination of gravitational forces, specific gravity of the ball(s), sphericity of the ball(s) and size then allow the ball(s) to fall, sink or roll down the tubing and pass through restrictions in the wellbore. When introduced into a horizontal well, the spherical ball(s) will generally flow into the lowest point of the well. When introduced into a deviated well, the spherical pellets easily may flow past obstructions as they are pulled by gravity through the deviations in the well path where traditional mechanical means such as wire line or coil tubing may not be able to reach. The shaped pellets have applicability when used during completion of a well having multiple deviations such as those wells having an "S" shaped configuration.

Once the spherical ball(s) reach their targeted area, they will slowly dissolve, providing a residual of the well treatment agent in produced fluids. Thus, the slow dissolution of the ball(s) provides the means to inhibit and/or remove unwanted deposits in the tubing.

When dropped directly into the well head, it is often only necessary to use one spherical ball. Typically, no more than ten spherical balls need be used to effectuate the slow release of the well treatment agent. Slow dissolution of the spherical balls permits slow dissolution of the well treatment agent.

The shaped pellets further are useful in gas wells having a tubing pressure of from about 1 to about 10,000 psi. Exemplary of such wells are shale gas wells. Further the spherical particulates have applicability in unobstructed tubulars. For instance, the spherical pellets are useful in those wells where the hydrocarbons are no longer freely flowing, such as wells on bottom hole electric submersible pumps (ESP).

In another preferred embodiment of the invention, the shaped pellets may be simply lowered into the well. For instance, the particulates may be placed into a receptacle, such as a wire basket, and suspended at the bottom of the well by various means, such as by a wireline or by being hung to the bottom of a rod pump. When the particulates are depleted of the well treatment agent, the wire basket may then be pulled to the surface and reloaded with additional particulates for further treatment In another embodiment, the pellet may be placed into a receptacle and the receptacle then affixed to the bottom of a bottom hole electric submersible pump by hanging the receptacle from the bottom of the bottom hole electric submersible pump. The bottom hole electric submersible pump with the affixed receptacle may then be lowered into the well.

The shaped compressed pellet may be used in completion or production services. The shaped compressed pellet may be used in the well to remove undesired contaminants from or control the formation of undesired contaminants onto tubular surface equipment within the wellbore The well treatment agent is preferably a liquid material. If the well treatment agent is a solid, it can be dissolved in a suitable solvent, thus making it a liquid.

The well treatment agent is preferably water soluble or soluble in aliphatic and aromatic hydrocarbons. In a preferred embodiment, the well treatment agent may be at least one member selected from the group consisting of demulsifying agents (both water-in-oil or oil-in-water), corrosion inhibitors, scale inhibitors, paraffin inhibitors, gas hydrate inhibitors, salt formation inhibitors, asphaltene dispersants, foaming agents, oxygen scavengers, hydrogen sulfide scavengers, water soluble tracers, oil soluble traders, biocides and surfactants as well as other agents wherein slow release into the production well is desired.

When fluid is produced, the well treatment agent may desorb into its respective solubilizing liquid. For instance, where a solid well treatment is an inhibitor for scales, corrosion, salts or biocidal action, the treatment agent may desorb into produced water. In the absence of water flow, the well treatment agent may remain intact on the solid adsorbent. As another example, solid inhibitors for paraffin or asphaltene may desorb into the hydrocarbon phase of produced fluid.

The shaped pellets of the invention may be employed with carrier or treatment fluids in order to facilitate placement of the composite to a desired location within the formation. In this regard, any carrier fluid suitable for transporting the composite may be used. Well treatment compositions containing the composite may be gelled or non-gelled. In one embodiment, the well treatment composites described herein may be introduced or pumped into a well as neutrally buoyant particles in, for example, a saturated sodium chloride solution carrier fluid or a carrier fluid that is any other completion or workover brine known in the art. Suitable carrier fluids include or may be used in combination with fluids have gelling agents, cross-linking agents, gel breakers, surfactants, foaming agents, demulsifiers, buffers, clay stabilizers, acids, or mixtures thereof. The shaped compressed pellets may further be advantageously employed in liquefied gas and foamed gas carrier fluids, such as liquid CO2, CO2/N2, and foamed N2 in CO2 based systems.

The carrier fluid may be a brine (such as a saturated potassium chloride or sodium chloride solution), salt water, fresh water, a liquid hydrocarbon, or a gas such as nitrogen or carbon dioxide. The amount of composite present in the well treating composition is typically between from about 15 ppm to about 100,000 ppm depending upon the severity of the scale deposition. Suitable compositions include fracturing fluids, completion fluids, acidizing compositions, etc.

In a particularly preferred embodiment, the shaped compressed pellets are used in wells in order inhibit the formation of scales, control the formation of scales or retard the release of scale inhibitors into the well. Suitable scale inhibitors are those which are efficacious in the treatment of scales of calcium, barium, magnesium salts and the like, including barium sulfate, calcium sulfate, and calcium carbonate scales as well as inorganic scales, such as zinc sulfide, iron sulfide, etc.

Suitable scale inhibitors are anionic scale inhibitors.

Exemplary scale inhibitors are strong acidic materials such as a phosphonic acid, a phosphoric acid or a phosphorous acid, phosphate esters, phosphonate/phosphonic acids, the various aminopoly carboxylic acids, chelating agents, and polymeric inhibitors and salts thereof thereof. Included are organo phosphonates, organo phosphates and phosphate esters as well as the corresponding acids and salts thereof.

Phosphonate/phosphonic acid type scale inhibitors are often preferred in light of their effectiveness to control scales at relatively low concentration. Polymeric scale inhibitors, such as polyacrylamides, salts of acrylamido-methyl propane sulfonate/acrylic acid copolymer (AMPS/AA), salts of sulfonated co-polymer (VS-Co), phosphinated maleic copolymer (PHOS/MA) or sodium salt of polymaleic acid/acrylic acid/acrylamido-methyl propane sulfonate terpolymers (PMA/AMPS), are also effective scale inhibitors. Sodium salts are preferred.

Further useful, especially for brines, are chelating agents, including diethylenetriaminepentamethylene phosphonic acid and ethylene diamine tetra acetic acid.

Further preferred as scale removal agents are inorganic and organic strong acids such as hydrochloric acid, acetic acid and formic acid. Caustic scale removal agents may be employed to remove sulfate scales and may include sodium hydroxide, chelants such as EDTA, glucoheptonate, and urea.

The well treatment agent may further be any of the fructans or fructan derivatives, such as inulin and inulin derivatives, as disclosed in U.S. Patent Publication No. 2009/0325825, herein incorporated by reference.

Exemplary of the demulsifying agents that are useful include, but are not limited to, condensation polymers of alkylene oxides and glycols, such as ethylene oxide and propylene oxide condensation polymers of di-propylene glycol as well as trimethylol propane; and alkyl substituted phenol formaldehyde resins, bis-phenyl diepoxides, and esters and diesters of the such di-functional products. Especially preferred as non-ionic demulsifiers are oxyalkylated phenol formaldehyde resins, oxyalkylated amines and polyamines, di-epoxidized oxyalkylated polyethers, etc. Suitable oil-in-water demulsifiers include poly triethanolamine methyl chloride quaternary, melamine acid colloid, aminomethylated polyacrylamide etc.

Paraffin inhibitors useful as the well treatment agent include, but are not limited to, ethylene/vinyl acetate copolymers, acrylates (such as polyacrylate esters and methacrylate esters of fatty alcohols), and olefin/maleic esters.

Exemplary corrosion inhibitors useful for the practice of the invention include but are not limited to fatty imidazolines, alkyl pyridines, alkyl pyridine quaternaries, fatty amine quaternaries and phosphate salts of fatty imidazolines.

Gas hydrate treating chemicals or inhibitors that are useful for the practice of the present invention include but are not limited to polymers and homopolymers and copolymers of vinyl pyrrolidone, vinyl caprolactam and amine based hydrate inhibitors such as those disclosed in U.S. Patent Publication Nos. 2006/0223713 and 2009/0325823, both of which are herein incorporated by reference.

Exemplary asphaltene treating chemicals include but are not limited to fatty ester homopolymers and copolymers (such as fatty esters of acrylic and methacrylic acid polymers and copolymers) and sorbitan monooleate.

Suitable tracers include dyes (such as phenoxazone dyes, fluroescein, pyridinium betaines dyes, solvatochromatic dyes, Oregon Green, Cascade Blue, *Lucifer* yellow, Auramine O, tetramethylrhodamine, pysranine, sulforhodamines, hydroxycoumarins; polysulfonated pyrenes; cyanines, hydroxylamines, neutral red, acridine orange; acids (such as picric acid and salicylic acid) or salts thereof; ionizable compounds (such as those which provide ammonium, boron, chromate, etc., ions); and radioactive materials (such as krypton-85); isotopes; genetically or biologically coded materials; microorganisms; minerals; and high molecular weight synthetic and natural compounds and polymers (such as oligonucleotides, perfluorinated hydrocarbons like perfluoro butane, perfluoro methyl cyclopentane and perfluoro methyl cyclohexane).

The tracer may also be a chelate, such as ethylene diamine tetra acetic acid (EDTA)) or a salt thereof. U.S. Pat. No. 4,264,329, herein incorporated by reference, discloses acceptable metal chelates formed by reacting aryl substituted ethylene diamine tetra acetic acid and a metal ion selected from the consisting of lead, cadmium and zinc. Such chelates react with fluorogenic agents, such as fluorescamine and o-phthalaldehyde. Fluorescence spectroscopy is then used to detect the chelate.

The hydrogen sulfide scavenger may be an oxidant, such as an inorganic peroxide, e.g. sodium peroxide, or chlorine dioxide, or an aldehyde, e.g. of 1 to 10 carbons such as formaldehyde or glutaraldehyde or (meth)acrolein or an amine based scavenger, such as a triazine or a hexamine.

Suitable foaming agents include, but are not limited to, those which are amphoteric, anionic or cationic. Preferred anionic foaming agents include betaines, alkyl ether sulfates, oxyalkylated sulfates, alkoxylated alcohol sulfates, phosphate esters, alkyl ether phosphates, alkoxylated alcohol phosphate esters, alkyl sulfates as well as alpha olefin sulfonates. Included as amphoteric surfactants are glycinates, amphoacetates, propionates, betaines and mixtures thereof.

Exemplary surfactants include cationic, amphoteric, anionic and nonionic surfactants. Included as cationic surfactants are those containing a quaternary ammonium moiety (such as a linear quaternary amine, a benzyl quaternary amine or a quaternary ammonium halide), a quaternary sulfonium moiety or a quaternary phosphonium moiety or mixtures thereof. Suitable surfactants containing a quaternary group include quaternary ammonium halide or quaternary amine, such as quaternary ammonium chloride or a quaternary ammonium bromide. Included as amphoteric surfactants are glycinates, amphoacetates, propionates, betaines and mixtures thereof. The cationic or amphoteric surfactant may have a hydrophobic tail (which may be saturated or unsaturated) such as a $C_{12}$-$C_{18}$ carbon chain length. Further, the hydrophobic tail may be obtained from a natural oil from plants such as one or more of coconut oil, rapeseed oil and palm oil.

Preferred surfactants include N,N,N trimethyl-1-octadecammonium chloride: N,N,N trimethyl-1-hexadecammonium chloride; and N,N,N trimethyl-1-soyaammonium chloride, and mixtures thereof. Suitable anionic surfactants are sulfonates (like sodium xylene sulfonate and sodium naphthalene sulfonate), phosphonates, ethoxysulfates and mixtures thereof.

Exemplary oxygen scavengers include triazines, maleimides, formaldehydes, amines, carboxamides, alkylcarboxylazo compounds cumine-peroxide compounds morpholino and amino derivatives morpholine and piperazine derivatives, amine oxides, alkanolamines, aliphatic and aromatic polyamines.

The binder, to which the composite is added, generally serves to hold the well treatment agent and any desired additives agents together during compression. Suitable binders may be an organic binder or inorganic binder. Typical organic binders are those selected from resole or novolac resins, such as phenolic resole or novolac resins, epoxymodified novolac resins, epoxy resins, polyurethane resins, alkaline modified phenolic resoles curable with an ester, melamine resins, urea-aldehyde resins, urea-phenol-aldehyde resins, furans, synthetic rubbers, silanes, siloxanes, polyisocyanates, polyepoxys, polymethylmethacrylates, methyl celluloses, crosslink entangled polystyrene divinylbenzenes, and plastics of such polymers as polyesters, polyamides, polyimides, polyethylenes, polypropylenes, polystyrenes, polyolefins, polyvinyl alcohols, polyvinylacetates, silyl-modified polyamides and, optionally, a crosslinking agent. Typical inorganic binders include silicates, e.g., sodium silicate, aluminosilicates, phosphates, e.g., polyphosphate glass, borates, or mixtures thereof, e.g., silicate and phosphate.

The amount of binder added to the composite to form the compressed pellet is typically from about 0.5 to about 50, preferably from about 1 to about 5 percent based on the total weight of the binder and composite, prior to compression.

Prior to being shaped, a weighting agent may be combined with the composite and binder in order to impart to the shaped pellet a higher specific gravity. When present, the amount of weighting agent added to the composite is that amount needed to adjust the specific gravity of the shaped particulate to the requirements of the treated well. Suitable weighting agents include sand, glass, hematite, silica, sand, aluminosilicate, and an alkali metal salt or trimanganese tetraoxide.

The shaped particulates may be produced by procedures known in the art. Typically the shaped particulates are formed by combining the well treatment composite and, optional, weighting agent, with a binder and then compressing the mixture in a mold of the desired shape or extruding the mixture into its desired shape.

Exemplary of the process for making the shaped particulates is to combine the composite, prepared in accordance with the teachings set forth in U.S. Pat. No. 7,493,955 or 7,494,711, with an organic binder and then compressing the mixture at a temperature between from about 20° C. to about 50° C. at a pressure of from between 50 to about 5000 psi. The hardened particulates may then be screened to the desired size and shape. In another preferred embodiment, the shaped composites are produced by a continuous extrusion at a temperature between from about 400° C. to about and 800° C.

The shaped particulates may further be coated with a resin, plastic or sealant which is resistant to the hydrocarbons produced in the well. Suitable resins include phenolic resins like phenol formaldehyde resins, melamine formaldehyde resins, urethane resins, epoxy resins, polyamides, such as nylon, polyethylene, polystyrene, furan resins or a combination thereof.

The coating layer serves to strengthen the compressed pellet, protect the pellet from harsh environmental conditions, protect the pellet from rupturing as it is lowered into the well and to lengthen the time of release of the well treatment agent from the pellet. The coating layer may be applied to the pellet by mixing the pellet and coating material in a vessel at elevated temperatures, typically from about 200 to about 350, preferably around 250° F. An adherent, such as a resin adhesive or tackifying resin, may further be added to the vessel during mixing. The adherent may be used to assist the adhesion of the coating onto the compressed pellet. Alternatively, the coating layer may also be applied as a spray in a solvent based coating on the compressed pellet and then dried to remove the solvent.

Adsorption of the well treatment agent onto the adsorbent reduces (or eliminates) the amount of well treatment agent required to be in solution. Since the well treatment agent is adsorbent onto a substrate, only a small amount of well treatment agent may be released into the aqueous medium.

In another embodiment, the calcined porous metal oxide of the composite may be reactivated or recharged with the well treatment agent after at least a portion of the well treatment agent has been depleted. Such processes are disclosed in U.S. Pat. No. 7,686,081 and U.S. Patent Publication no. 2010/0175875, both of which are herein incorporated by reference.

In this procedure, an initial charge of the composite may be injected into the well bore in a conventional method, whether for fracturing or for gravel packing. Such conventional methods include truck treating, continuous injection, or high pressure pumping, for example. The downhole matrix formed within the formation after the initial charge is comprised of the well treatment agent on a water-insoluble adsorbent as part of the sand matrix.

Additional amounts of fluid containing the well treatment agent may be injected into the formation anytime after the initial charge of well treatment agent in the composite has at least partially depleted. Typically, the additional well treatment agent is introduced when the well treatment agent adsorbed onto the adsorbent or within the interstitial spaces of the composite has been substantially depleted and the performance level of the well treatment agent in the composite has become unacceptable.

The injection of additional well treatment agent may be carried out in the same manner by which the initial composite was charged into the wellbore, and can be carried out in any conventional method of injecting fluids into a wellbore of an oil or gas well, as mentioned above. The fluid which is injected will typically be comprised of the desired well treatment agent(s) in a solution which further comprises a solvent. The relative amounts of the solvent and treatment agent of the solution to be injected into the wellbore will of course vary depending upon the agent and solvent involved, but will typically be of a solvent to treatment agent ratio in the range of about 10:90 to about 95:5, by weight. The solvent in one embodiment is xylene, toluene, or a heavy aromatic distillate or a mixture thereof. When a mixture of all of xylene, toluene and heavy aromatic distillate is used, the relative amounts of each solvent component can vary, but will be typically in variable weight ratios (xylene:toluene:heavy aromatic distillate) such as 10:70:20, 20:70:10, 70:20:10 or 20:10:70. In another embodiment, the solvent can be water (for water soluble well treatment agents).

After the injection step is carried out, the wellbore is pressurized for a time and under conditions sufficient to reactivate the downhole matrix in the formation. This pressurization of material in the wellbore and formation fracture is commonly referred to as a "squeeze." Reactivation of the treatment agent downhole may occur through the squeeze process as long as the activity of the treatment agent in the in-place matrix is increased relative to the treatment agent activity of the matrix just prior to injecting the solution. The determination of whether the treatment agent activity has increased relative to the activity of that agent just prior to injection of the solution and completion of the squeeze may be made through conventional residual analysis and comparison of the same before and after the squeeze, and conventional analysis of the physical well parameters, e.g., the production rate of the well and well pressure.

The pressure to which the wellbore is pressurized in the squeeze process typically will be a pressure below the fracturing pressure, and when applicable, below the pressure that would cause the gravel pack to break up. In one embodiment of the invention, the pressure is in a range of about 500 to about 15000 psia. The duration for which the pressure condition is applied to the well will vary, depending upon the ease of fracturing, but will typically be in the range of about 2 to about 10 hours.

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

EXAMPLES

All percentages set forth in the Examples are given in terms of weight units except as may otherwise be indicated.

Example 1

In accordance with the procedure set forth in U.S. Pat. No. 4,013,587, alumina spheres were prepared by hydrolyzing aluminum alkoxide. The resulting spheres were then dried to remove the water. The dried aluminum was then dispersed into an oil at about 90° C. Gel particles were formed.

Water insoluble spherical particles of greater than 95% alumina were recovered as Sample A. The spherical alumina beads consisted of bohemite alumina (non calcined) having a 1 mm diameter, a pore volume of 0.5 cc/g and a surface area of 216 m2/g.

A portion of Sample A was calcined at 1200° C. for 2 hours to render spherical beads of 1 mm diameter (Sample B) composed of alpha/delta theta alumina and having a pore volume of 0.08 cc/g and a surface area of 3 m²/g.

A portion of Sample A was calcined at 1400° C. for 2 hours to render spherical beads of 1 mm diameter (Sample C) composed of alpha alumina and having a pore volume of 0.03 cc/g and a surface area of 4 m²/g.

Example 2

Each of Sample A, Sample B and Sample C were added at different weight percent loadings to commercial lightweight ceramic proppant, commercially available as CARBO LITE® from Carbo Ceramics Inc. of Dallas, Tex., and the crush was determined according to ISO13503-2: Measurement of Properties of Proppants used in Hydraulic Fracturing and Gravel Packing Operations) The results are shown in Table I below wherein the Comparative Sample is a 10/50 mesh diatomaceous earth (Celite MP-79):

TABLE I

| STRESS, psi | CONCEN-TRATION | Comparative Sample CRUSH % | Sample A CRUSH % | Sample B CRUSH % | Sample C CRUSH % |
|---|---|---|---|---|---|
| 4000 | 0% | 0.24 | 0.15 | 0.15 | 0.15 |
|  | 2% | NA | 0.68 | 0.36 | 0.32 |
|  | 4% | NA | 0.83 | 0.24 | 0.34 |
|  | 10% | 5.88 | 3.16 | 0.61 | 0.39 |
| 6000 | 0% | 0.92 | 0.92 | 0.92 | 0.92 |
|  | 2% | 2.77 | 2.09 | 1.09 | 1.09 |
|  | 4% | 5.08 | 4.18 | 1.09 | 0.90 |
|  | 10% | 11.49 | 9.57 | 1.48 | 1.46 |
| 8000 | 0% | 5.29 | 5.44 | 5.44 | 5.44 |
|  | 2% | 7.14 | 8.38 | 6.22 | 5.61 |
|  | 4% | 10.23 | 9.72 | 5.15 | 5.15 |
|  | 10% | 17.21 | 17.30 | 5.44 | 5.03 |

TABLE I-continued

| STRESS, psi | CONCEN-TRATION | Comparative Sample CRUSH % | Sample A CRUSH % | Sample B CRUSH % | Sample C CRUSH % |
|---|---|---|---|---|---|
| 10000 | 0% | NA | 12.32 | 12.32 | 12.32 |
|  | 2% | NA | 17.38 | 11.25 | 12.20 |
|  | 4% | NA | 22.31 | 14.12 | 9.96 |
|  | 10% | NA | 24.98 | 12.56 | 11.45 |

The results indicate that the non-calcined Sample A has strength comparable to the diatomaceous earth of the Comparative Sample, whereas calcined Sample B and Sample C had the strength of commercial ceramic proppant in that even after the addition of 10% by weight of Sample B or Sample C the crush strength of the combined proppant particle mixtures, even at 10,000 psi stress, was not altered.

Example 3

Scale inhibitor amino tri(methylene phosphonic acid) (ATMP), commercially available as Dequest 2000 from ThermPhos International BV was adsorbed onto each of Sample A, Sample B and Sample C to render Samples FBG-90706-4A, FBG-90706-4B and FBG-90706-4C respectively. These Samples were prepared by first adsorbing water on the Samples to determine how much water could be adsorbed. Water was added to the sample until the Sample appeared wet. Sample A was found to adsorb 0.698 g of H2O/g of sample, Sample B adsorbed 0.362 g of H2O/g of sample, and Sample C adsorbed 0.415 g of H2O/g of sample. Next Dequest 2000 was added to each sample. Due to the low adsorbency compared to diatomaceous earth, two additions were followed to prepare the samples. In the first addition for Sample A, only 0.32 g of Dequest 2000/g of Sample A could be added. In the second addition, 0.25 g of Dequest 2000/g of Sample A could be added. This results in a product which contains about 22% active content. The method used to prepare the diatomaceous earth based product set forth in U.S. Pat. No. 7,493,955 was adapted to these alumina samples. For Sample B, only 0.31 g of Dequest 2000/g of Sample B could be added followed by 0.13 g of Dequest 2000/g of Sample B in the second addition. This results in a product which contains about 18% active content. For Sample C, only 0.23 g of Dequest 2000/g of Sample C could be added followed by 0.08 g of Dequest 2000/g of Sample C in the second addition. This results in a product which contains about 13.5% active content. The properties of each of these samples is set forth in Table II below:

TABLE II

| | | Product | | |
|---|---|---|---|---|
| Alumina | | FBG 90607-4A Sample A | FBG 90607-4B Sample B | FBG 90607-4C Sample C |
|---|---|---|---|---|
| Nominal Content | % by weight | 22 | 18 | 13.5 |
| Determined Content | | 19.6 | 15.5 | 12.0 |
| Bulk Density | Loose lb/ft³ | 36 | 81 | 97 |
| | Packed | 43 | 90 | 105 |
| Specific gravity | H₂O = 1 | 4.22 | 3.50 | 3.43 |
| pH | 10% Slurry | 2.16 | 1.65 | 1.76 |

Example 4

Figure 1B:
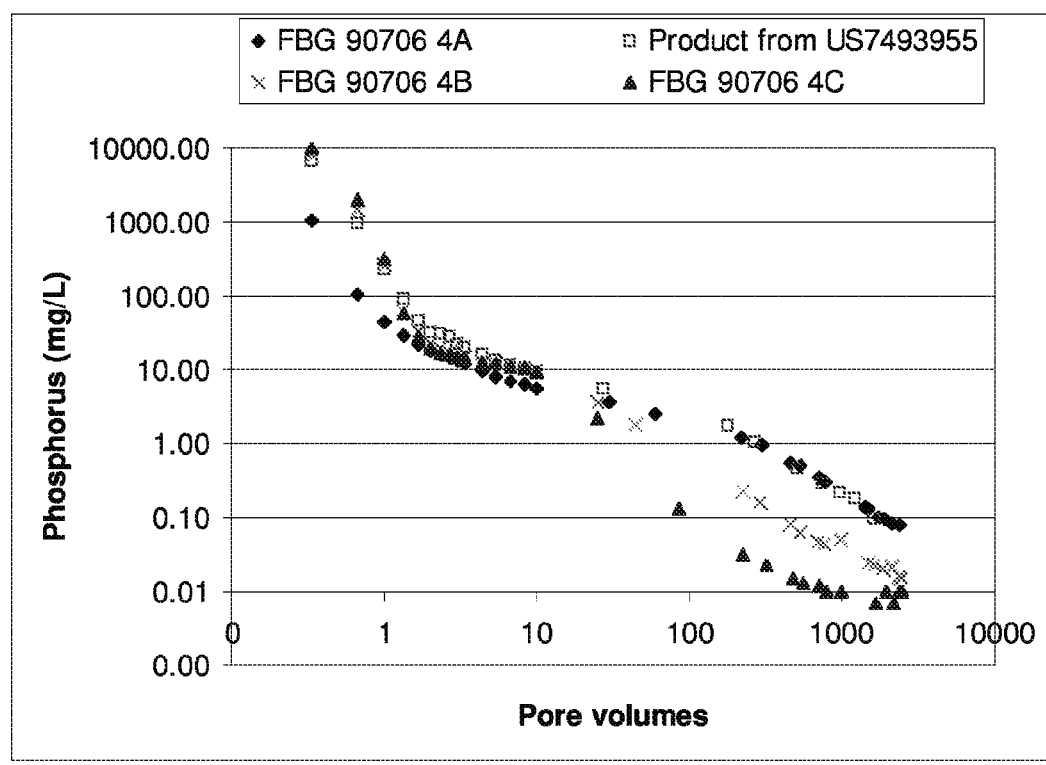

The elution characteristic of the solid composites of Example 3 were determined by packing 20/40-mesh Ottawa sand and solid inhibitor (2% by weight of the sand) into a 35-cm-long stainless steel column (inner diameter=1.08 cm). The pore volume was approximately 12 mL. The column was eluted with synthetic brine (0.025 mol/L CaCl2, 0.015 mol/L NaHCO3, 1 mol/L NaCl, sparged with 100% CO2) at 60° C. with a flow rate of 120 mL/hour. The synthetic brine was at saturation with calcite 60° to simulate typical connate brine in the formation. The effluent solution was collected and analyzed for phosphorus and Ca concentration to obtain the inhibitor release profile. The results are shown in FIG. 1A and FIG. 1B. The minimum effective concentration for scale inhibition was 0.1 ppm.

Example 5

Five alumina samples labeled 23A, 23B, 23C, 23D and 23E were prepared. 23-A was the same as Sample A (1 mm alumina bead, not calcined); 23-B was the same as Sample B (1 mm alumina beads calcined at 1200° C. for 2 hours) and 23-C was the same as Sample C (1 mm alumina bead calcined at 1400° C. for 2 hours). Samples 23D and 23E were prepared using the same protocols as Sample B and Sample C, respectively, except the diameter of the spherical beads was adjusted to 0.8 mm. Each of 23A, 23B, 23C, 23D and 23E were heated to 225° F. and cooled to room temperature in a desiccator before the addition of the ATMP solution. A 55% by weight solution of ATMP was prepared. Three additions were made to each sample and the amount that was able to be adsorbed is set forth in Table III below:

TABLE III

| Alumina | g Alumina | g $1^{st}$ Addition | g $2^{nd}$ Addition | g $3^{rd}$ Addition | % ATMP by weight sample |
|---|---|---|---|---|---|
| 23A | 50.001 | 3.00 | 3.25 | 0.84 | 7.2 |
| 23B | 50.005 | 9.43 | 6.52 | 1.34 | 16.0 |
| 23C | 50.004 | 5.29 | 1.83 | 0.70 | 7.9 |
| 23D | 50.008 | 9.81 | 9.10 | 3.98 | 20.1 |
| 23E | 50.006 | 9.93 | 3.80 | 2.02 | 14.8 |

The results shown in Table III are in contrast to 22.1% for Sample A, 18.1% for Sample B and 13.5% for Sample C.

Example 6

Figure 2:
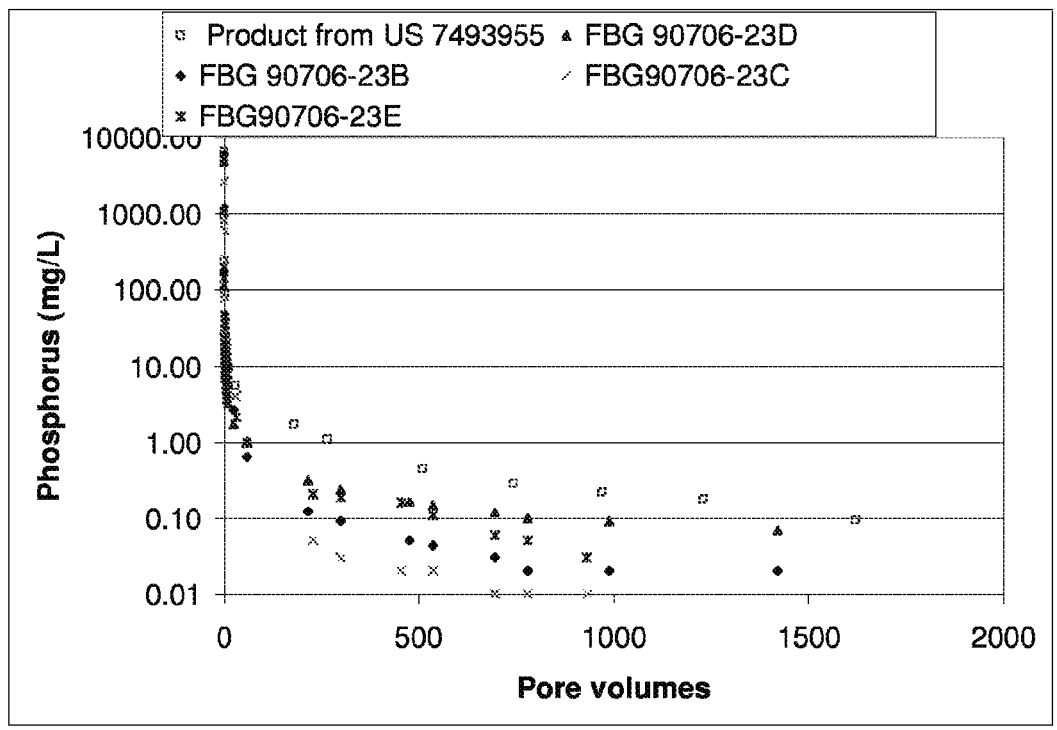
FIG. 2 is a release profile of a scale inhibitor in high strength composites containing porous alumina adsorbent of varying diameter between 0 to 2,000 pore volumes.
Figure 3:
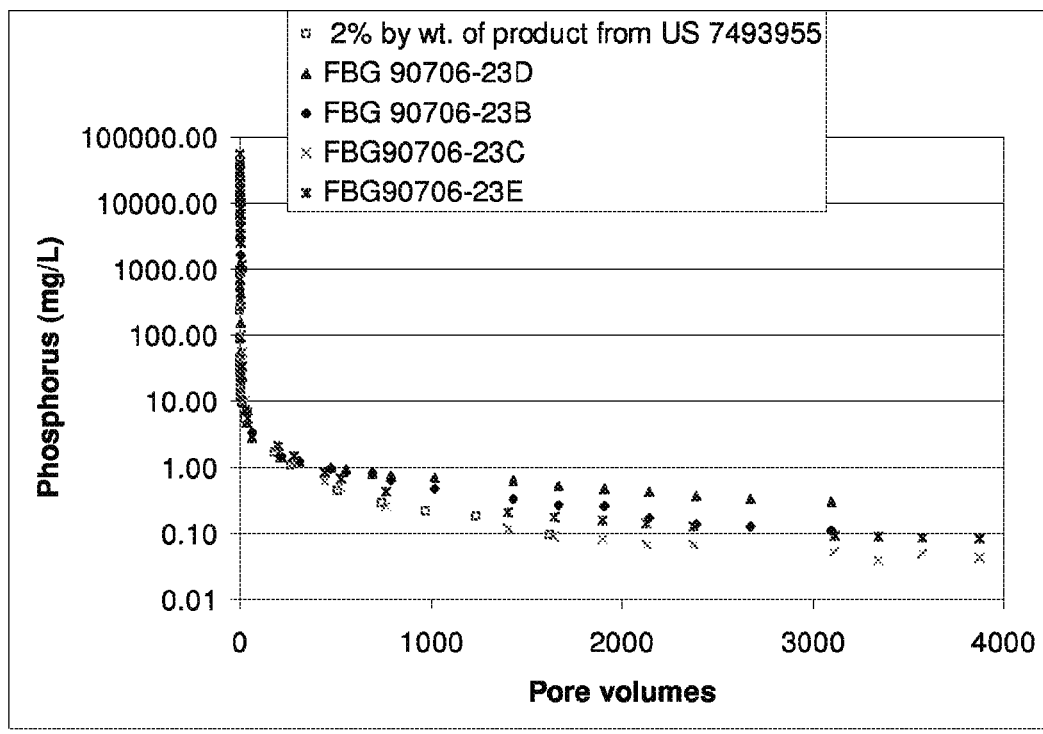
FIG. 3 is a release profile of a scale inhibitor in high strength composites containing porous alumina adsorbent of varying diameter using a sand pack using 50% of the particles as in FIG. 2.

The elution of Samples 22B, 23C, 23D, 23E and the Comparative Sample of Example 2 were performed as set forth by the method in Example 4 with 2% of the particles by weight of the sand in the column. The results are shown in FIG. 2. The results are similar to those illustrated in FIG. 1A and FIG. 1B. Since there is commercial interest in using higher percentage of the particles in a proppant pack, the elution studies were performed on the samples at 50% of the particles in the sand pack and the results are shown in FIG. 3. FIG. 3 indicates much slower release and longer period of effective inhibition.

Example 7

Four samples were prepared of two different sizes (0.8 mm and 1.0 mm diameter before calcining) in accordance with the procedure set forth in Example 1. The four samples were labeled as CO10118 (0.8 mm), CO10118 (1 mm), CO10524 (0.8 mm) and CO10593 (1 mm). Sample CO10118, after calcining, had a size of 25 mesh (0.71 mm) and a surface area of 1 m²/g; sample CO10118, after calcining, had a size of 30 mesh (0.59 mm) and a surface area of less than 1 m²/g. Sample CO10524, after calcining, had a size of 30 mesh (0.59 mm) and a surface area of 5.6 m²/g and sample CO10593, after calcining, had a size of 20 mesh (0.84 mm) and a surface area of 7.3 m²/g. Crush analysis was conducted on each of the samples as well as on ECONOPROP®, a commercial proppant available from Carbo Ceramics Inc. Further, two other samples labeled 25 mesh APA1.0/3C 12853 (surface area 3.1 m²/g) and 30 mesh APA0.8/3C 12852 were also prepared. The crush data on these is presented also in Table 4. The crush data of each sample was generated using a pluviation method to load the proppant in the API crush cell. The results are shown in Table IV below:

TABLE IV

| | Crushed Fines % | | | |
|---|---|---|---|---|
| Sample | 5000 psi | 6000 psi | 8000 psi | 10000 psi |
| 25 Mesh 0.8 mm CO10118 (Surface Area: 1 m²/g) | 0.5 | 0.8 | 1.9 | 8.4 |
| 30 Mesh 1.0 mm CO10118 (Surface Area: <1 m²/g) | 5.2 | 5.9 | 11.8 | 18.9 |
| 30 Mesh 0.8 mm CO10524 (Surface Area: 5.6 m²/g) | 9.0 | 12.1 | 24.6 | 37.6 |
| 20 Mesh 1.0 mm CO10593 (Surface Area: 7.3 m²/g) | 26.6 | 36.5 | 49.2 | 61.4 |
| 25 Mesh EconoProp | NA | NA | 21.5 | 24.9 |
| 30 Mesh EconoProp | 11.1 | 12.2 | 15.0 | 20.6 |
| 25 Mesh APA 1.0/3 C12853 (Surface Area: 3.1 m²/g) | 1.2 | 2.2 | 8.6 | 17.5 |
| 30 Mesh APA 0.8/3 C12852 (Surface Area: 3.1 m²/g) | 0.7 | 1.5 | 4.4 | 11.6 |
| 25 Mesh EconoProp | NA | NA | 21.4 | 26.0 |
| 30 Mesh EconoProp | 4.9 | 5.3 | 10.1 | 14.7 |

Example 8

Scale Inhibitor amino tri(methylene phosphonic acid) (ATMP), commercially available as Dequest 2000 from ThermPhos International BV was adsorbed onto the four samples of Example 7 and resultant materials were labeled FBG-100824A, FBG-100824B, FBG-100824C and FBG-100824D, respectively. The procedure for the preparation of these samples is set forth above in Example 3. The properties for each of the samples is set forth in Table V below:

TABLE V

| | | Sample | | | |
|---|---|---|---|---|---|
| | | FBG 100824 A | FBG 100824 B | FBG 100824 C | FBG 100824 D |
| Alumina | | CO10118, 0.8 mm | CO10524, 0.8 mm | CO10593, 1 mm | CO10118, 1 mm |
| Calculated Content | ATMP % by weight | 17.7 | 38.5 | 40.5 | 26.2 |
| Determined Content | | 9.7 | 16.7 | 20.6 | 13.2 |
| Bulk Loose | lb/ft³ | 106 | 88 | 87 | 100 |

TABLE V-continued

| | | Sample | | | |
|---|---|---|---|---|---|
| | | FBG 100824 A | FBG 100824 B | FBG 100824 C | FBG 100824 D |
| Density Packed | | 114 | 94 | 94 | 108 |
| Specific gravity | $H_2O = 1$ | 3.19 | 2.94 | 2.87 | 3.11 |
| Moisture | % by weight | 0.41 | 0.50 | 0.51 | 0.48 |

Example 9

Figure 4A:
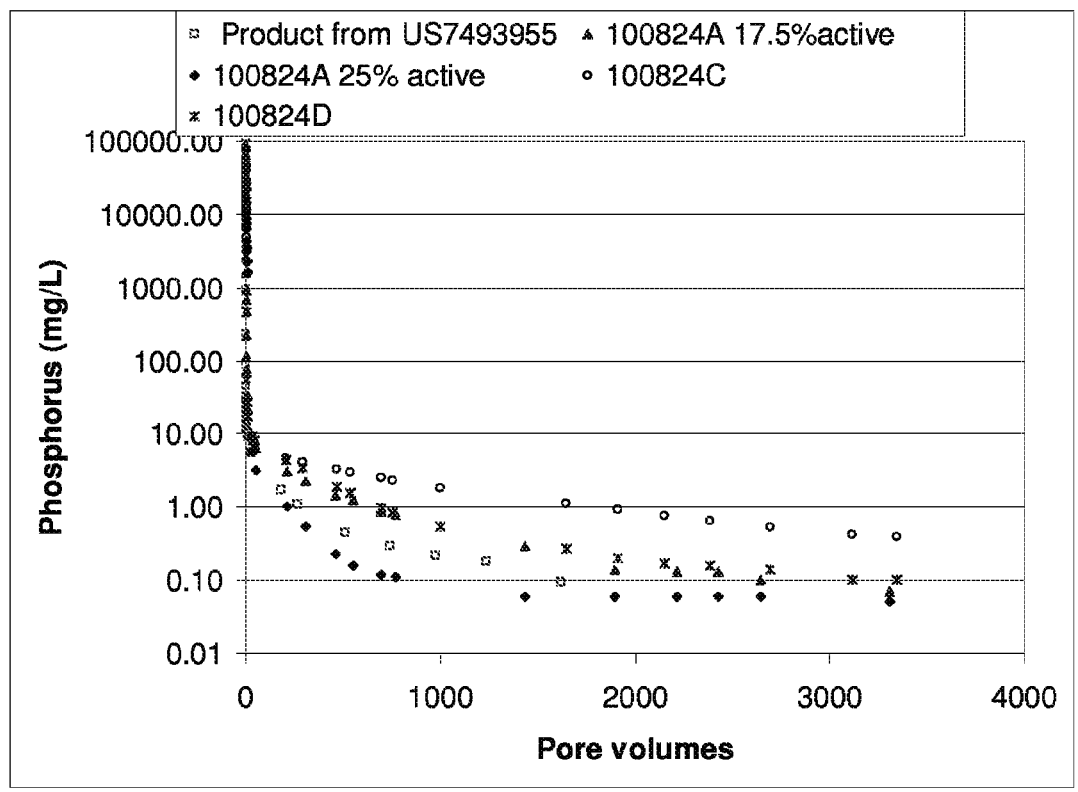
FIG. 4A and FIG. 4B are release profiles of a scale inhibitor in high strength composites containing porous alumina adsorbents of varying diameters and sizes between 0 to 4,000 pore volumes and 0 to 10,000 pore volumes, respectively.
Figure 4B:
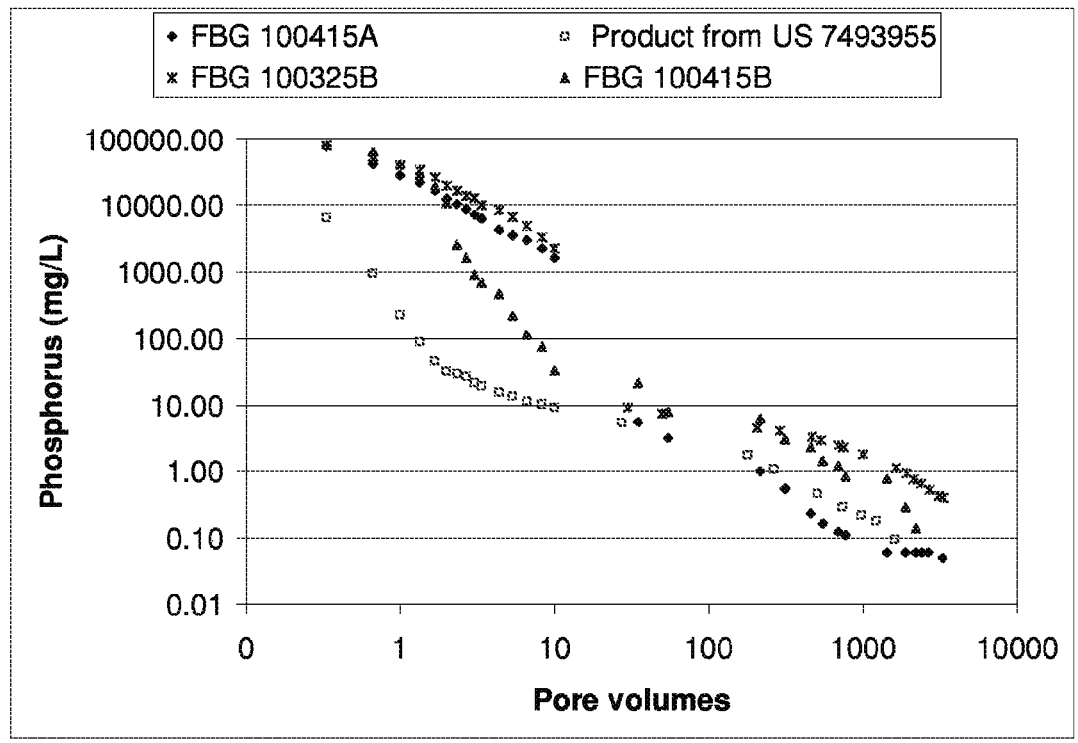

The elution of each of samples of Example 8 was performed in accordance with the procedures set forth in Examples 4 and 6 with 50% of the particles by weight of the sand in the column. The results are set forth in FIG. 4A and FIG. 4B and are compared to the results of 2% of loading of the composite exemplified in U.S. Pat. No. 7,493,955. The results are similar to those of Example 6 and show that the amount of composite may be tailored with the amount of proppant depending on the amount of water produced from the well and how long protection is desired. As illustrated, 2% of the particles in the sand and 50% particles in the sand may be used for the same purpose.

Example 10

About 800 g of 10/50 mesh diatomaceous earth (Celite MP-79) absorbent was added into a mixing bowl. A paddle mixer blade was attached and liquid organophosphate (Solutia Dequest 2000) was added to the mixing bowl at a rate in which the liquid was readily absorbed, and the liquid did not puddle. After all of the liquid was added, mixing was continued until a homogenous blend was produced. The blend was then dried at 225 F until the percent moisture of the resulting product was less than 3%. The composite thus prepared contained 25 percent by weight of organophosphate scale inhibitor. To the composite was then added a binder of an epoxy resin (A), phenolic resin (B) and polyvinyl alcohol (C). The mixture contained about 50 percent by weight of the resin. The mixture was then compressed under a pressure of about 250 psi for about 1 minute in a mold to render a cylindrical pellet resembling a hockey puck having a diameter of about 1 inch and a thickness of about 0.5 inch to render puck (A), (B) and (C) corresponding to the epoxy resin binder, phenolic resin binder and polyvinyl alcohol binder, respectively. Puck (D) was obtained by coating Puck (C) with an epoxy resin by spray and drying.

Example 11

Figure 5:
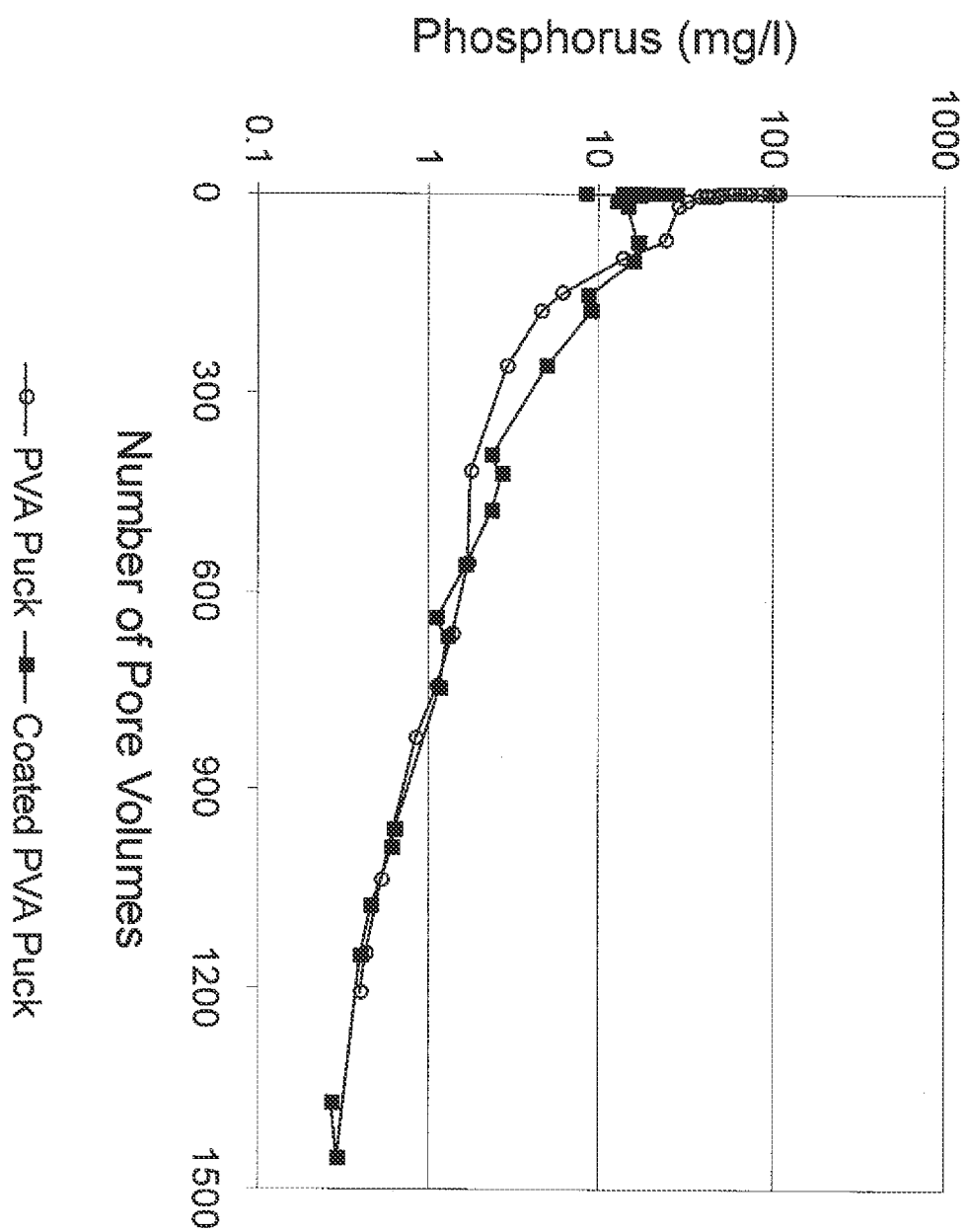
FIG. 5 illustrates the inhibitor return curve for a compressed pellet of a composite of scale inhibitor and adsorbent in a polyvinyl alcohol matrix [Puck (C)] and an epoxy matrix [Puck (D)].

The elution characteristics of Puck C and Puck D were then determined by packing approximately 440 grams 20/40 Ottawa white frac sand and 3 pieces of the pucks into a 30 cm length stainless steel column (ID=3.48 cm). The pore volume of the column was approximately 80 milliliters. The column was eluted with a synthetic brine (0.025 mol/L $CaCl_2$, 0.015 mol/L $NaHCO_3$, 1 mol/L NaCl, sparged with 100% $CO_2$) at 60° C. at a flow rate of 270 ml/hour. The effluent solution was collected and analyzed for phosphorus and calcium concentration to obtain the inhibitor flow back curve, set forth in FIG. 5. As illustrated in FIG. 5, the concentration of phosphorus in the effluent gradually decreased as synthetic brine was pumped into the column. After 1200 pore volumes of return flow, the concentration of effluent phosphorus remained approximately 0.4 ppm. There was no significant difference found between the phosphorus return curves of Puck (C) and Puck (D). The data demonstrates the ease that the pucks have while flowing through production tubing.

Example 12

Figure 6:
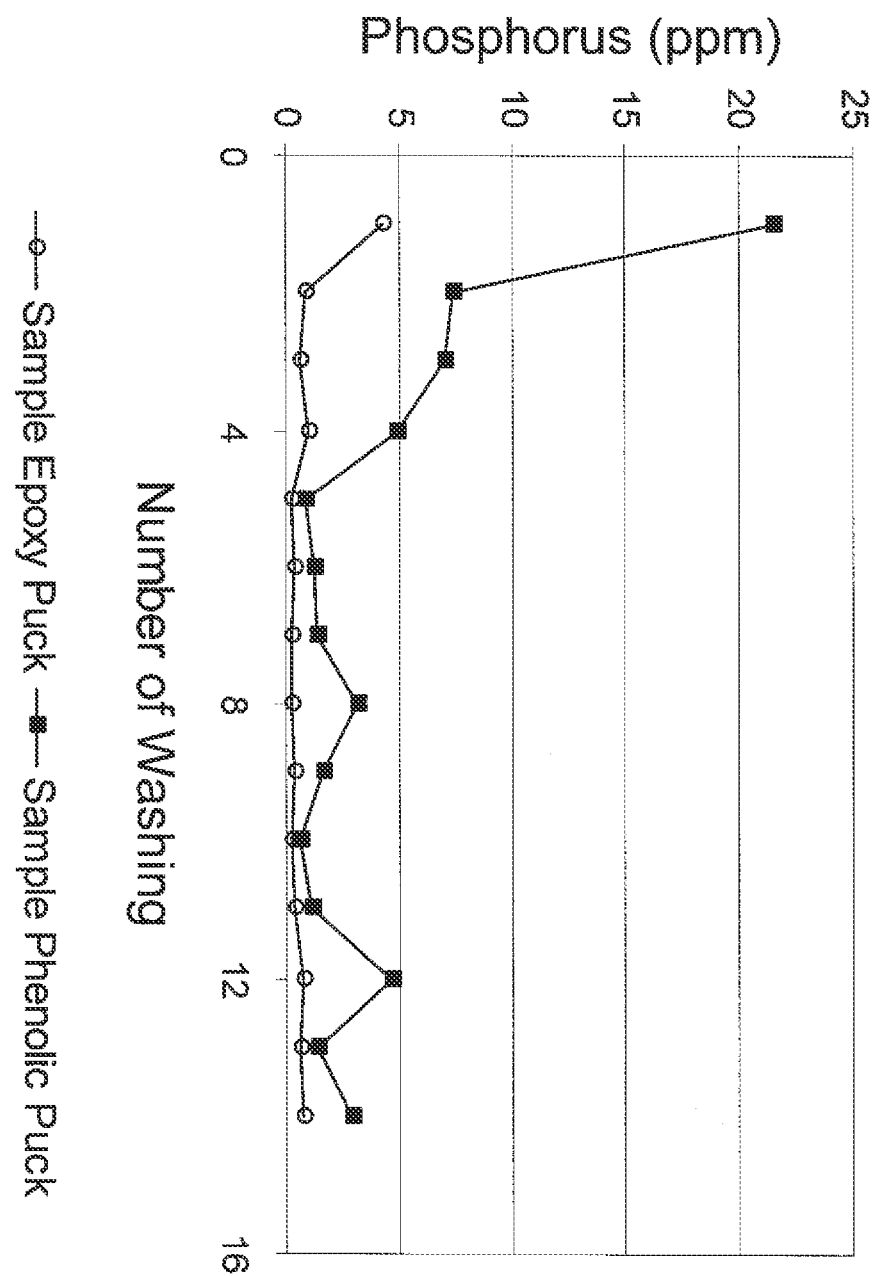
FIG. 6 illustrates the results of static breaker tests on a compressed pellet of a composite of scale inhibitor and adsorbent in an epoxy matrix [Puck (A)] and phenolic matrix [Puck (B)].

Puck (A) and Puck (B) were mixed with 500 ml of water. After 30 minutes, the supernatant was removed and the concentration of phosphorus in the supernatant was measured by (ICP) spectrophotometer. The test was repeated 14 times. The amount of residual phosphorous in the supernatant, illustrated as the static breaker test, is illustrated in FIG. 6. FIG. 6 demonstrates that the concentration of phosphorus in the effluent concentration of Puck (B) was higher than that of sample Puck (A) after washing with tap water.

Example 13

Figure 7:
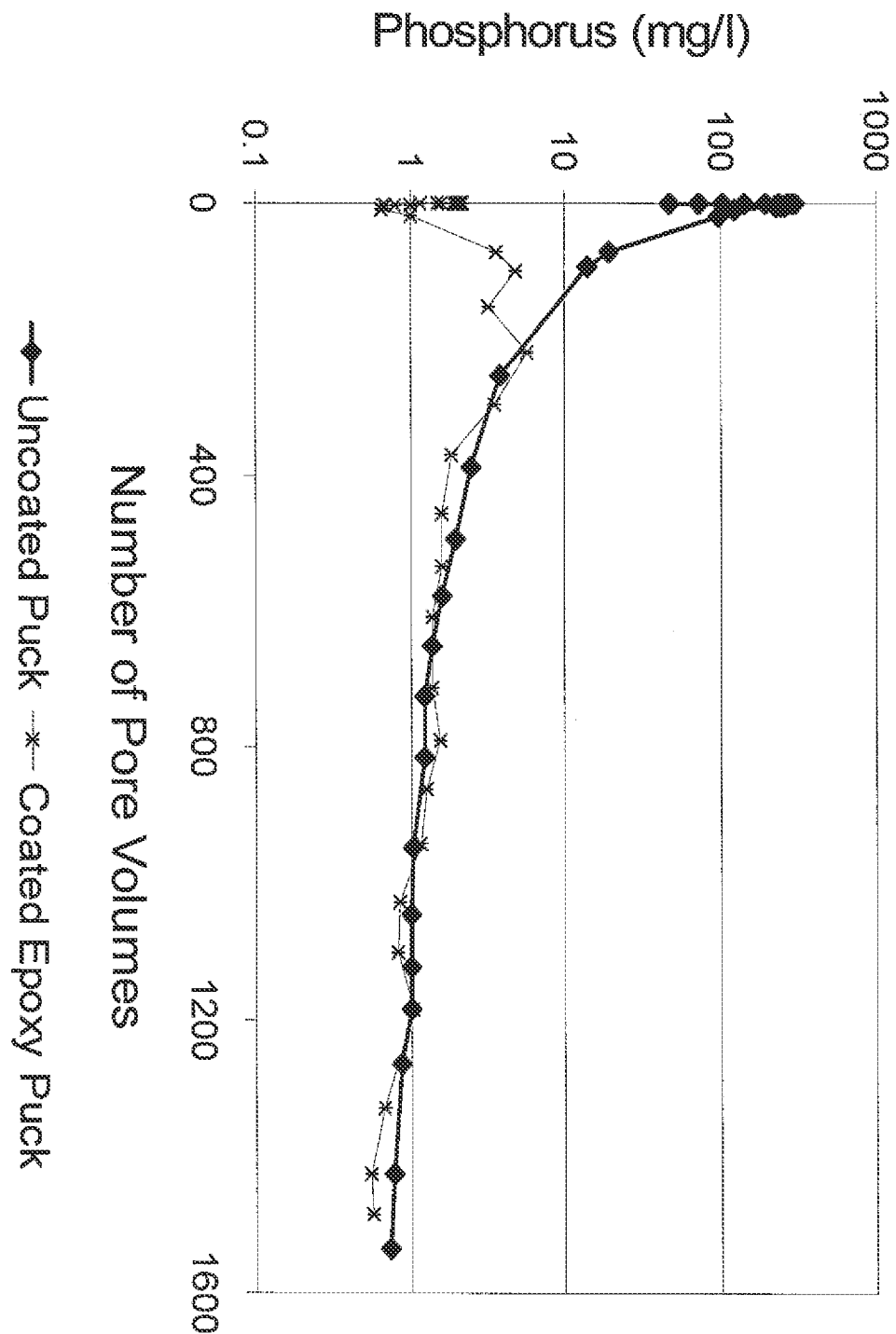
FIG. 7 illustrates the inhibitor return curve for a compressed pellet of a composite of scale inhibitor and adsorbent in a high melting polyethylene wax wherein only one of the pucks is coated with an epoxy resin.
Figure 5:
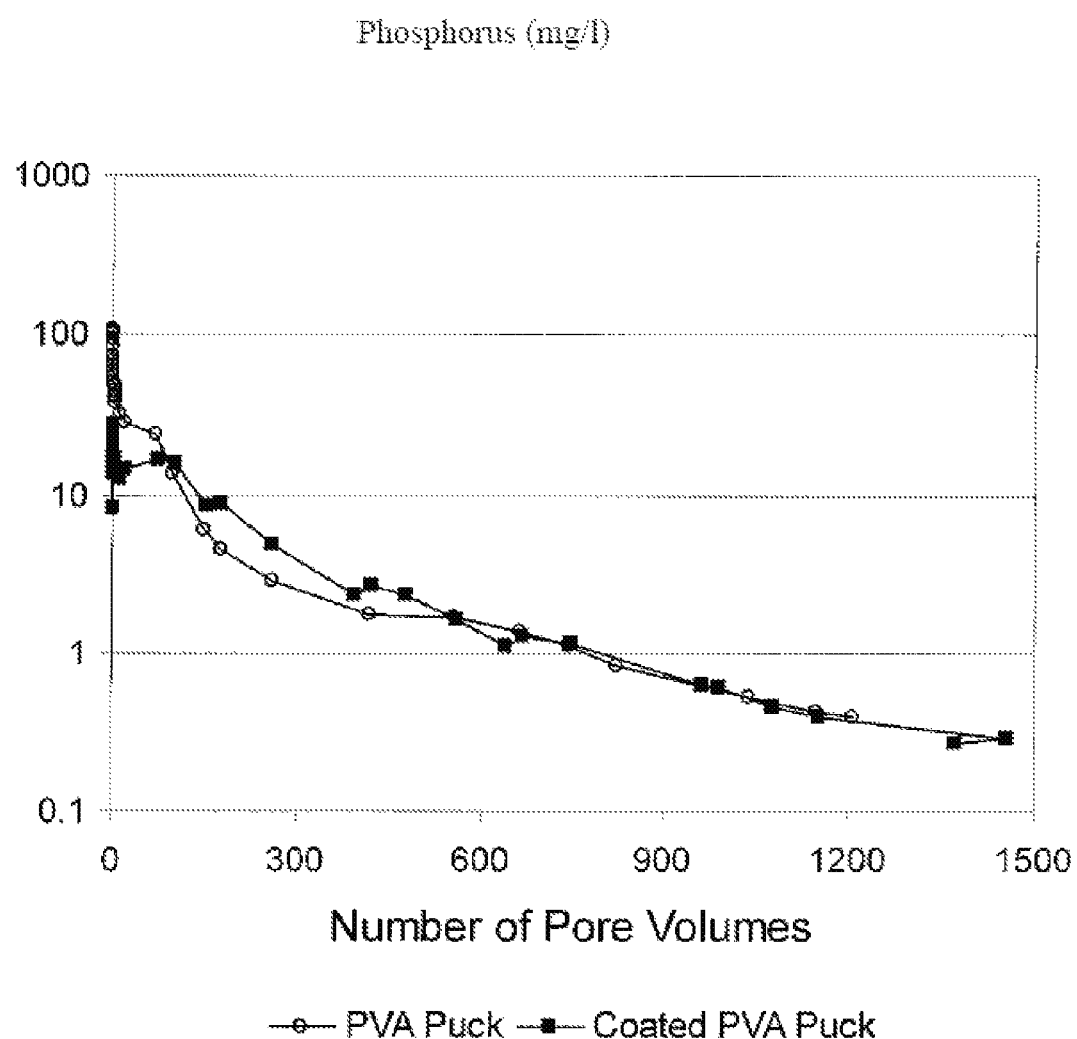
Figure 6:
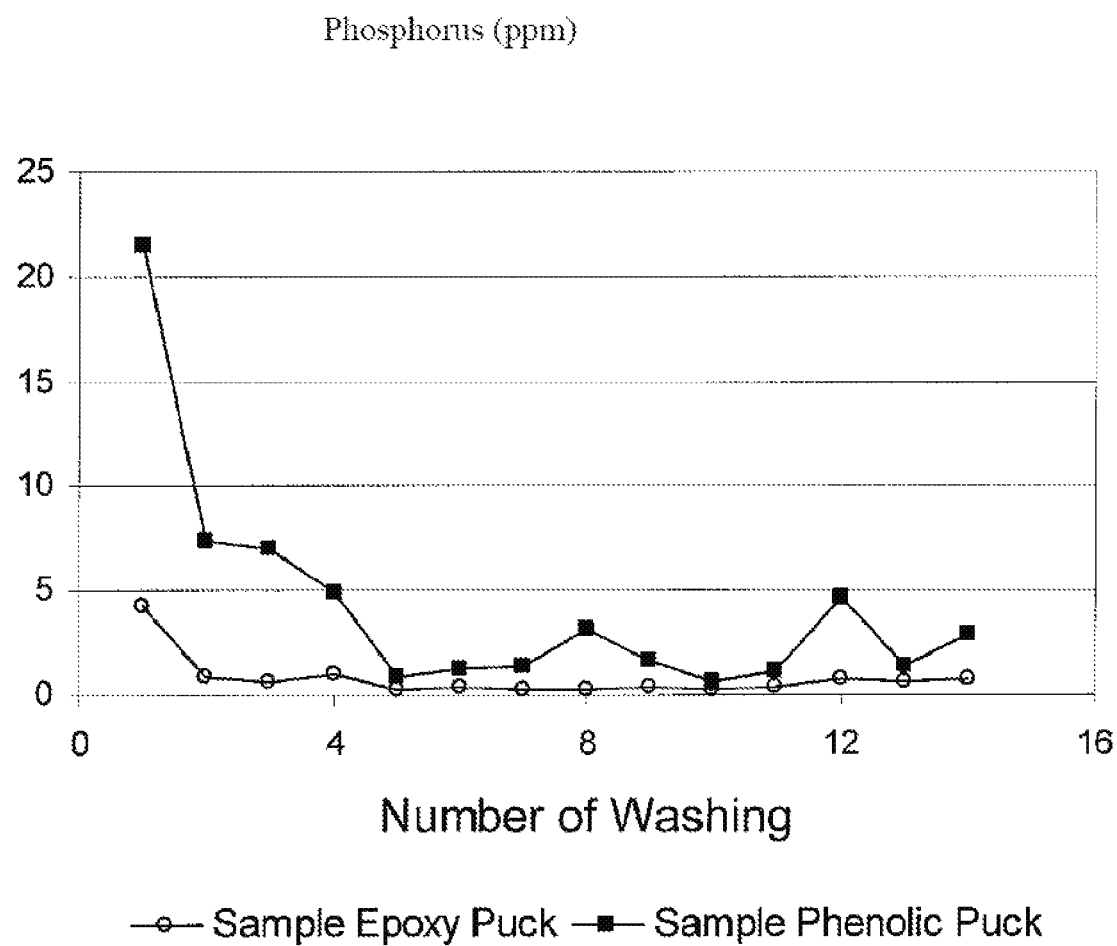
Figure 7:
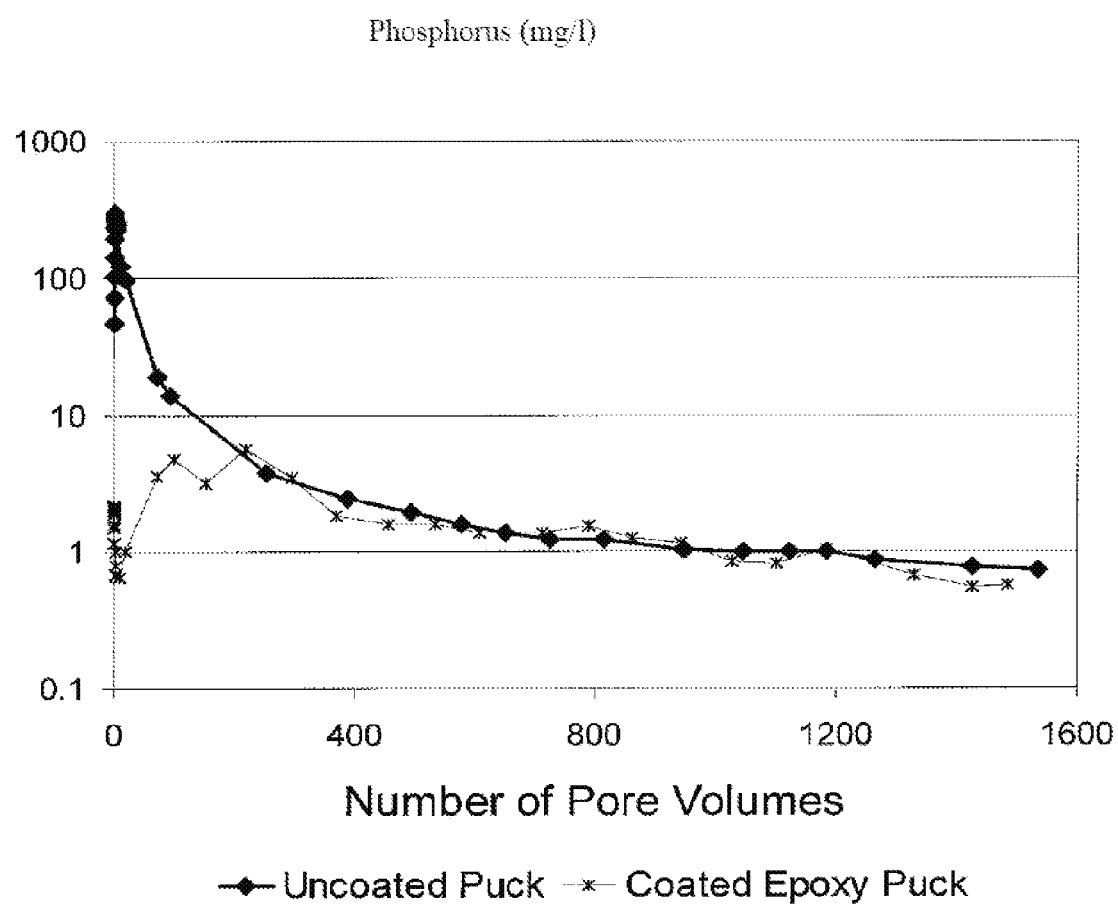

To about 95% by weight of the composite of Example 5 was added about 5% by weight of a high melting polyethylene wax. The mixture was then compressed into a pellet having a diameter of 1 inch and about half inch in height to obtain Puck (E). Puck (F) was obtained by coating the compressed pellet of Puck (E) with about 20 weight % epoxy resin and drying the coated resin at 120° F. Puck(E) and Puck (F) were then immersed in water at 180° F. for five days. No deterioration was seen in either puck after 5 days. Puck (E) and Puck (F) were also immersed in W. Texas Crude Oil for two weeks at 140° F. No deterioration was seen in either puck after two weeks. Elution studies were then conducted on Puck (E) and Puck (F) in accordance with the testing conditions of Example 11. FIG. 7 represents the inhibitor flow back curve of Puck (E) and Puck (F). The results indicate the release of scale inhibitor above the minimum effective inhibitor concentration of 0.1 mg/l even after 1500 pore volumes of fluid elution through the column when the testing was terminated. The results of the release curve for the coated Puck (F) indicate no premature release of the inhibitor at the beginning which should result in longer effectiveness of the puck.

From the foregoing, it will be observed that numerous variations and modifications may be effected without departing from the true spirit and scope of the novel concepts of the invention.

What is claimed is:

1. A method of inhibiting or controlling the rate of release of a well treatment agent in a well by:
    (a) introducing into the well a shaped compressed pellet of a binder and a well treatment composite, the well treatment composite comprising a well treatment agent and calcined porous metal oxide wherein the porosity and permeability of the calcined porous metal oxide is such that the well treatment agent is adsorbed onto the porous metal oxide or into the interstitial spaces of the porous metal oxide, the shaped compressed pellet prepared by (i) calcining a porous metal oxide, (ii) adsorbing the well treatment agent onto the calcined porous metal oxide or into the interstitial spaces of the calcined porous metal oxide to form the well treatment composite, (iii) adding a binder to the well treatment composite, and then (iv) compressing the binder and well treatment composite into a desired shape; and
    (b) releasing the well treatment agent from the compressed pellet into the well.

2. The method of claim 1, wherein at least one of the following conditions prevail:
   a. the surface area of the calcined porous metal oxide is between from about 1 m²/g to about 10 m²/g;
   b. the diameter of the calcined porous metal oxide is between from about 0.1 to 3 mm;
   c. the pore volume of the calcined porous metal oxide is between from about 0.01 to about 0.10 cc/g;
   d. the bulk density of the composite is between from about 75 to about 150 lb/ft³; or
   e. the specific gravity of the well treatment composite is less than or equal to 3.75 g/cc.

3. The method of claim 1, wherein the shaped compressed pellet is spherical.

4. The method of claim 1, wherein the well treatment composite contains between from about 1 to about 50 weight percent of the well treatment agent.

5. The method of claim 1, wherein the calcined porous metal oxide further contains silica.

6. The method of claim 1, wherein the well treatment agent is selected from the group consisting of scale inhibitors, corrosion inhibitors, paraffin inhibitors, salt inhibitors, gas hydrate inhibitors, asphaltene inhibitors, oxygen scavengers, hydrogen sulfide scavengers, water soluble tracers, oil soluble tracers, biocides, foaming agent, emulsion breakers and surfactants and mixtures thereof.

7. The method of claim 6, wherein the well treatment agent is a scale inhibitor.

8. The method of claim 1, wherein the porous metal oxide subjected to calcination in (a)(i) is alumina.

9. The method of claim 1, where the well treatment agent is released from the calcined porous metal oxide at a constant rate over an extended period of time into formation fluid within the well or the subterranean formation penetrated by the well.

10. The method of claim 1, further comprising introducing the well treatment agent into the well after at least a portion of the well treatment agent on the composite has been depleted in order to recharge or reactivate the calcined porous metal oxide of the well treatment composite.

11. The method of claim 1, wherein at least one of the following conditions prevail:
   (a) the shaped compressed pellet is directly dropped into the well from the well head;
   (b) the shaped compressed pellet is directly dropped into the production tubing within the well; or
   (c) the shaped compressed pellet is introduced into the well in a receptacle and further wherein the receptacle is suspended in the well to a targeted area.

12. The method of claim 11, wherein the shaped compressed pellet is introduced into the well in a receptacle suspended at the bottom of the well by a wireline.

13. The method of claim 11, wherein the shaped compressed pellet is introduced into the well in a receptacle hung to bottom of a rod pump.

14. The method of claim 1, wherein the well is a horizontal or deviated well.

15. The method of claim 14, wherein the well is a deviated well and wherein the deviations in the well are between from 45° to about 89° or wherein the deviations in the well are S-shaped.

16. The method of claim 1, wherein the amount of binder added to the composite to form the compressed pellet is from about 0.5 to about 50 percent based on the total weight of the binder and composite prior to compression.

17. A method of inhibiting or controlling the rate of release of a well treatment agent in a well comprising:
   (a) placing into a receptacle a shaped compressed pellet of a binder and a composite of a well treatment agent adsorbed onto a water-insoluble adsorbent or into interstitial spaces of the adsorbent; the shaped compressed pellet prepared by (i) adsorbing the well treatment agent onto the water-insoluble adsorbent or into the interstitial spaces of a porous metal oxide to form the well treatment composite, (iii) adding a binder to the well treatment composite, and then (iv) compressing the binder and well treatment composite into a desired shape; and
   (b) affixing the receptacle to the bottom of a bottom hole electric submersible pump by hanging the receptacle from the bottom of the bottom hole electric submersible pump;
   (c) lowering the bottom hole electric submersible pump with the affixed receptacle into the well; and
   (d) continuously releasing the well treatment agent from the water-insoluble adsorbent.

18. The method of claim 17, wherein the composite comprises a shaped compressed pellet of a binder and a well treatment composite, the well treatment composite comprising a well treatment agent and calcined porous metal oxide wherein the porosity and permeability of the calcined porous metal oxide is such that the well treatment agent is adsorbed onto the porous metal oxide or into the interstitial spaces of the porous metal oxide.

19. The method of claim 17, wherein the well treatment agent is a scale inhibitor.

20. The method of claim 17, wherein the adsorbent is diatomaceous earth.

21. A method of inhibiting or controlling the formation of unwanted deposits in a deviated well by:
   (a) introducing into tubing in the well a shaped compressed pellet of a binder and a well treatment composite comprising a well treatment agent and calcined porous metal oxide wherein the porosity and permeability of the calcined porous metal oxide is such that the well treatment agent is adsorbed onto the calcined porous metal oxide or into the interstitial spaces of the calcined porous metal oxide and wherein the shaped compressed pellet is produced by (i) preparing a well treatment composite by adsorbing onto the calcined porous metal oxide or into the interstitial spaces of the calcined porous metal oxide the well treatment agent; (ii) mixing the well treatment composite with a binder; and (iii) compressing the well treatment composite and binder;
   (b) flowing the shaped compressed pellet over obstructions within the tubing and deviations in the well into a targeted area in the well where unwanted deposits are undesired; and
   (c) continuously releasing the well treatment agent from the shaped compressed pellet into the targeted area.

22. The method of claim 21, wherein the shaped compressed pellet is spherical.

23. The method of claim 21, wherein the well treatment agent is a scale inhibitor.

* * * * *